US011252787B2

(12) United States Patent
Kavuri et al.

(10) Patent No.: US 11,252,787 B2
(45) Date of Patent: Feb. 15, 2022

(54) SYSTEM ENABLERS FOR MULTI-SIM DEVICES

(71) Applicant: Apple Inc., Cupertino, CA (US)

(72) Inventors: Lakshmi N. Kavuri, Cupertino, CA (US); Alosious Pradeep Prabhakar, Singapore (SG); Krisztian Kiss, Hayward, CA (US); Muthukumaran Dhanapal, Dublin, CA (US); Sang Ho Baek, Palo Alto, CA (US); Shivani Suresh Babu, San Jose, CA (US); Srinivasan Nimmala, San Jose, CA (US); Utkarsh Kumar, Fremont, CA (US); Vijay Venkataraman, San Jose, CA (US); Viswanath Nagarajan, San Jose, CA (US); Yifan Zhu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/024,528

(22) Filed: Sep. 17, 2020

(65) Prior Publication Data

US 2021/0105866 A1 Apr. 8, 2021

Related U.S. Application Data

(60) Provisional application No. 62/910,350, filed on Oct. 3, 2019.

(51) Int. Cl.
*H04W 68/02* (2009.01)
*H04W 88/06* (2009.01)
(Continued)

(52) U.S. Cl.
CPC ........... *H04W 88/06* (2013.01); *H04W 8/183* (2013.01); *H04W 8/24* (2013.01); *H04W 60/00* (2013.01);
(Continued)

(58) Field of Classification Search
CPC ..... H04W 76/27; H04W 76/10; H04W 76/28; H04W 68/00; H04W 76/30;
(Continued)

(56) References Cited

U.S. PATENT DOCUMENTS

| 9,319,177 B2 | 4/2016 | Clevorn |
| 9,655,079 B2 * | 5/2017 | Jeong ................ H04W 36/0022 |

(Continued)

FOREIGN PATENT DOCUMENTS

| CN | 106385675 A | * | 2/2017 |
| EP | 2605562 A2 | | 6/2013 |

OTHER PUBLICATIONS

Extended European Search Report for EP 20199510.7-1231, dated; Mar. 2, 2021, 12 pages.

(Continued)

*Primary Examiner* — Gary Lafontant
(74) *Attorney, Agent, or Firm* — Kowert, Hood, Munyon, Rankin & Goetzel P.C.

(57) ABSTRACT

Apparatuses, systems, and methods for a user equipment device (UE) to perform methods for enhancement of multi-SIM devices, such as UE 106. A network may increase paging retries for known MU-SIM devices, e.g., based on an indication of capabilities from a MU-SIM device. The indication may be via a NAS registration request, an RRC capability procedure, and/or an RRC UE assistance procedure. Additionally, a network may include an indication of a paging priority to the UE. The UE may then determine a response to the page based, at least in part, on the indicated priority. Further, the UE may indicate a tune-away to the network. The indication of the tune-away may include a cause and/or duration for the tune-away and may be provided at an RRC level or a network access stratum (NAS) level.

20 Claims, 21 Drawing Sheets

(51) Int. Cl.
*H04W 76/25* (2018.01)
*H04W 76/27* (2018.01)
*H04W 8/18* (2009.01)
*H04W 8/24* (2009.01)
*H04W 60/00* (2009.01)
*H04W 68/00* (2009.01)
*H04W 84/04* (2009.01)

(52) U.S. Cl.
CPC ......... *H04W 68/005* (2013.01); *H04W 76/25* (2018.02); *H04W 76/27* (2018.02); *H04W 84/042* (2013.01)

(58) Field of Classification Search
CPC ... H04W 36/0033; H04W 8/18; H04W 76/25; H04W 84/027; H04W 72/04; H04W 52/0209; H04W 74/006
See application file for complete search history.

(56) References Cited

U.S. PATENT DOCUMENTS

| | | | |
|---|---|---|---|
| 9,769,867 B2 | 9/2017 | Ramkumar et al. | |
| 10,492,169 B2 | 11/2019 | Chen et al. | |
| 10,517,003 B2 | 12/2019 | Bhardwaj et al. | |
| 2012/0231802 A1* | 9/2012 | Ngai | H04W 72/1215 455/450 |
| 2013/0150014 A1* | 6/2013 | Gong | H04W 68/12 455/418 |
| 2013/0303203 A1 | 11/2013 | Wang et al. | |
| 2015/0245309 A1 | 8/2015 | Nayak et al. | |
| 2016/0234782 A1 | 8/2016 | Su et al. | |
| 2017/0127432 A1* | 5/2017 | Shah | H04W 48/18 |
| 2018/0368099 A1* | 12/2018 | Chen | H04W 48/18 |
| 2020/0128391 A1* | 4/2020 | Yun | H04W 72/0453 |

OTHER PUBLICATIONS

Intel Corporation "Motivation for RAN Level Multi-Sim Support", 3GPP TSG RAN #84 RP-191347, Newport Beach, US, Jun. 3, 2019, 7 pages.

Intel Corporation "Intel views on release-17", 3GPP TSG RAN Meeting #84 RP-191406, Newport Beach, US, Jun. 3, 2019, 36 pages.

* cited by examiner

| Rule # | Type of Access Attempt | Paging Category |
|---|---|---|
| 1 | Emergency Callback | 1 |
| 2 | VoLTE call | 2 |
| 3 | High priority data | 3 |
| 4 | SMS | 4 |
| 5 | UE configuration update initiation | 5 |
| 6 | Voice mail | 6 |
| 7 | Operator Configured | 32-64 |
| 8 | VoIP call | 7 |
| 9 | User perceivable incoming push | 8 |
| 10 | Background push | 9 |

FIG. 9A

| Procedure Type | Low Priority | High Priority |
|---|---|---|
| Long | Software updates, background traffic, and so forth | Emergency calls, Voice calls, high priority data, and so forth |
| Short | Slice specific updates, operator defined traffic, and so forth | NAS signaling, SMS, and so forth |

*FIG. 9B*

SYSTEM ENABLERS FOR MULTI-SIM DEVICES

PRIORITY DATA

This application claims benefit of priority to U.S. Provisional Application Ser. No. 62/910,350, titled "System Enablers for Multi-SIM Devices", filed Oct. 3, 2019, which is hereby incorporated by reference in its entirety as though fully and completely set forth herein.

FIELD

The present application relates to wireless devices, and more particularly to apparatuses, systems, and methods for delivering paging to a first SIM of a multi-SIM UE while the multi-SIM UE is actively communicating with another SIM.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR provides a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to apparatuses, systems, and methods for delivering paging to a first SIM of a multi-SIM UE while the multi-SIM UE is actively communicating with another SIM.

In some embodiments, a wireless device, e.g., such as a user equipment device (UE), may be configured to provide a network with an indication of capabilities. In some embodiments, the network may increase paging retries based on the indication, e.g., based on an indication of capabilities from a MU-SIM device. In some embodiments, the indication may be via a NAS registration request, a radio resource control (RRC) capability procedure, and/or an RRC UE assistance procedure. In some embodiments, a network may include an indication of a paging priority and/or a paging cause to the UE. The UE may then determine a response to the page based, at least in part, on the indicated priority and/or paging cause. In some embodiments, the UE may indicate a tune-away to the network. The indication of the tune-away may include a cause for the tune-away. In some embodiments, the indication may be provided at an RRC level or a network access stratum (NAS) level.

For example, in some embodiments, a MU-SIM UE may be configured to maintain idle mode connections for multiple SIMs. The SIMs of the MU-SIM UE may share radio frequency (RF) resources. In other words, RF resources, such as transmit and/or receive circuitry may be shared across the SIMs of the MU-SIM UE. A first SIM may be transitioned to connected mode based on a first page received from the network, e.g., from a first AMF of the network. The first page may include an indication of an associated first paging priority. Additionally, a second page intended for a second SIM may be received from the network, e.g., from a second AMF of the network. The second page may include an indication of a second paging priority. The MU-SIM UE may be further configured to transition RF resources form the first SIM to the second SIM based on a comparison of paging priorities indicated by the first page and the second page. In some embodiments, the transition may be based on a priority of the second page (e.g., as indicated by the second paging priority) being higher than a priority of the first page (e.g., as indicated by the first paging priority). In some embodiments, the MU-SIM UE may, after transitioning RF resources to the second SIM, respond to the second page, e.g., to perform a voice call, receive SMS data, receive high priority data, and so forth.

As another example, in some embodiments, an access management function (AMF) of a network may be configured to maintain an idle mode connection for a first SIM of a multiple SIM UE (MU-SIM UE), such as UE 106. The AMF may transmit a first page to the first SIM that may include an indication of an associated first paging priority. The first AMF may establish an RRC connection via a base station of the network with the first SIM to transition the idle mode connection associated with the first SIM to a connected mode, e.g., in order to perform actions associated with the first page. Additionally, the first AMF may receive a tune-away indication and/or suspend indication from the first SIM. The tune-away indication and/or suspend indication may include a cause of the tune-away and/or a cause of the suspension, e.g., such as reception of a higher priority page by another active SIM of the MU-SIM UE, e.g., from another AMF of the network. In some embodiments, responsive to the tune-away indication, the first AMF may release the CM connection and subsequently inform the base station (e.g., via an N2 interface) to release the RRC connection associated with the MU-SIM UE. In some embodiments, the first AMF may ignore paging instances in which an associated paging priority is lower than a paging priority associated with the cause of the tune-away, e.g., at least until expiration of a timer associated with the tune-away indication and/or receipt of a request to resume the RRC connection from the MU-SIM UE. In some embodiments, a first SMF may configure a UPF to ignore downlink data for a lower priority PDU session.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 9A illustrates an example of paging categories/causes and associated rules (or priority rank), according to some embodiments.

FIG. 9B illustrates an example of a set of precedence rules for paging categories/causes/service, according to some embodiments.

Figure 1A:
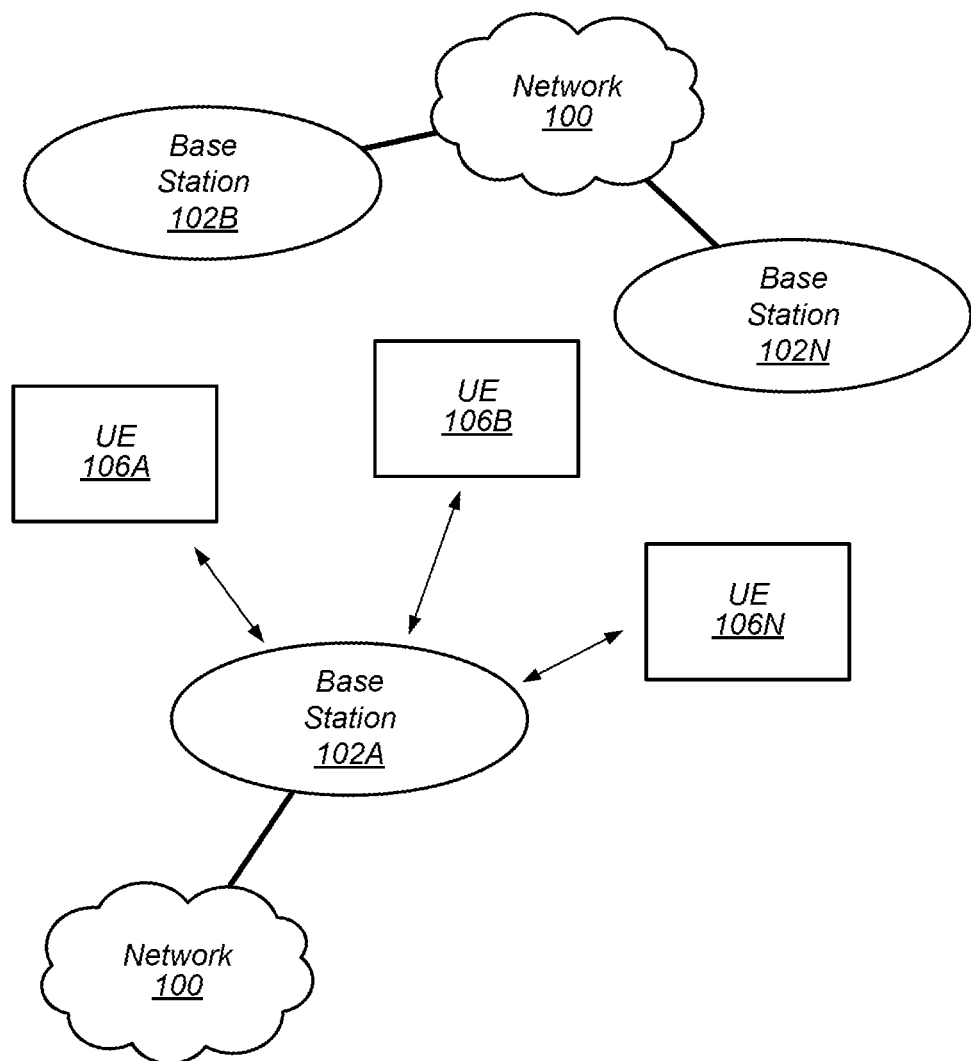
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
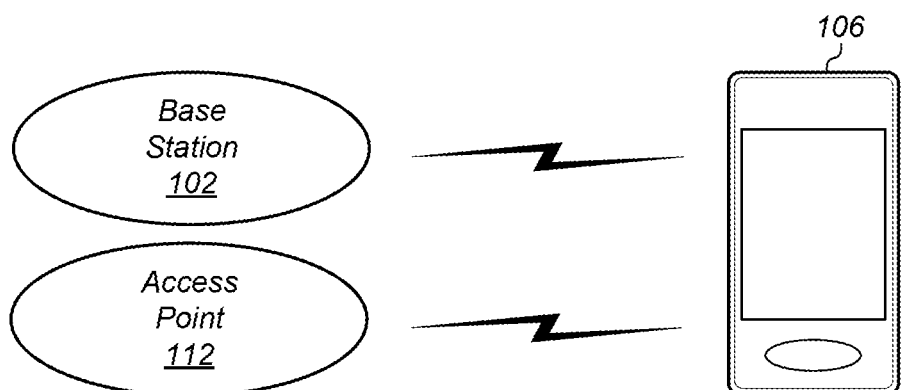
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
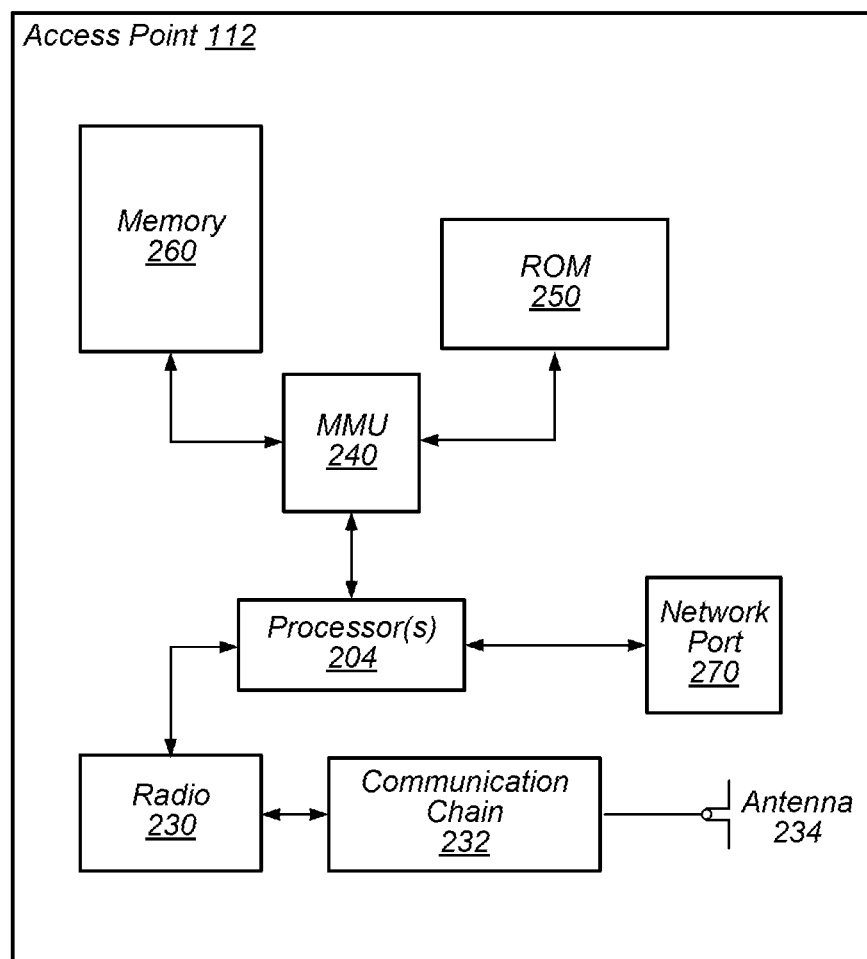
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for delivering paging to a first SIM of a multi-SIM UE while the multi-SIM UE is actively communicating with another SIM as further described herein.

Figure 3:
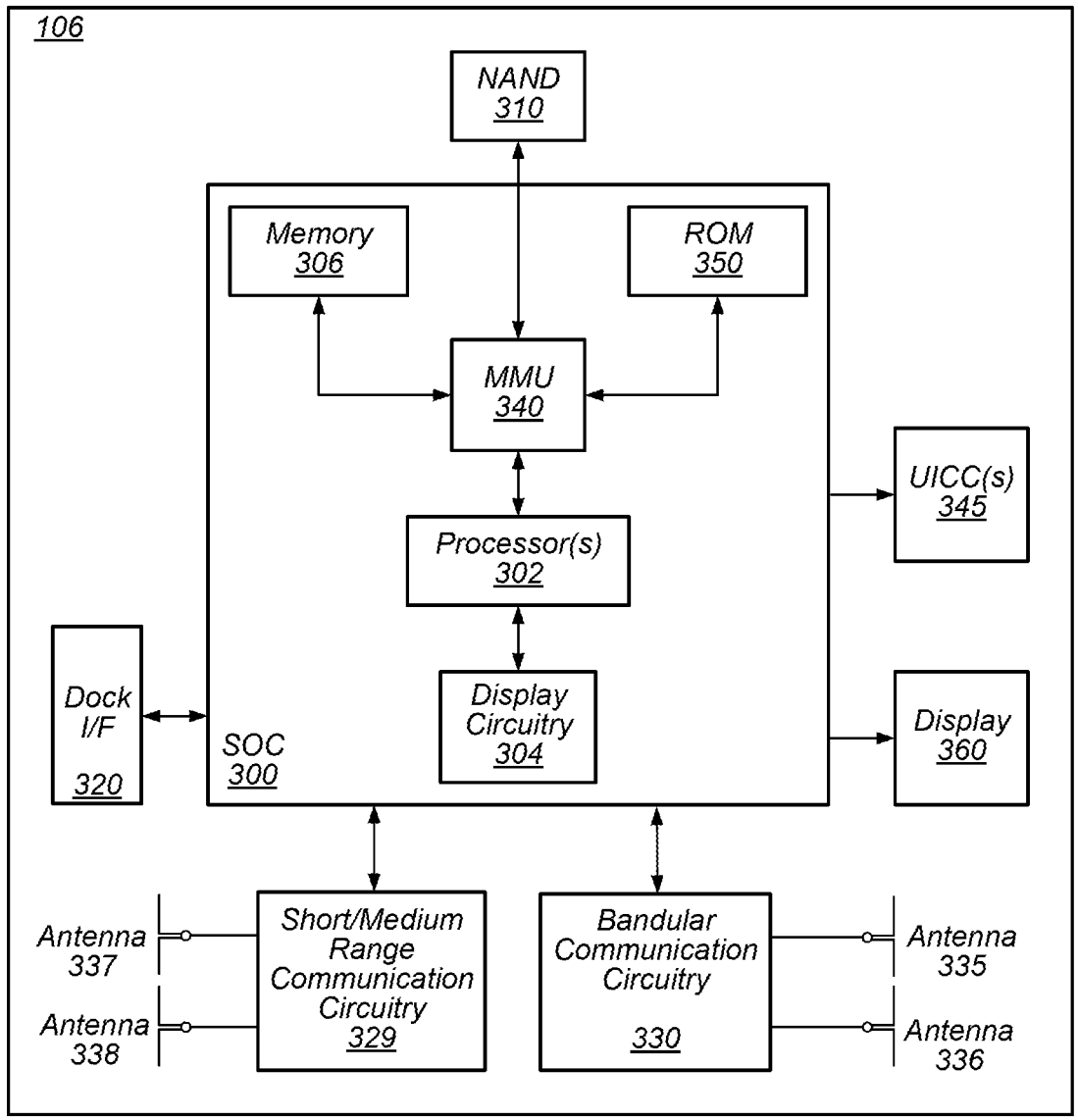
FIG. 3 illustrates an example block diagram of a UE according to some embodiments.

FIG. 3: Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMs 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for delivering paging to a first SIM of a multi-SIM UE while the multi-SIM UE is actively communicating with another SIM as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300,

304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
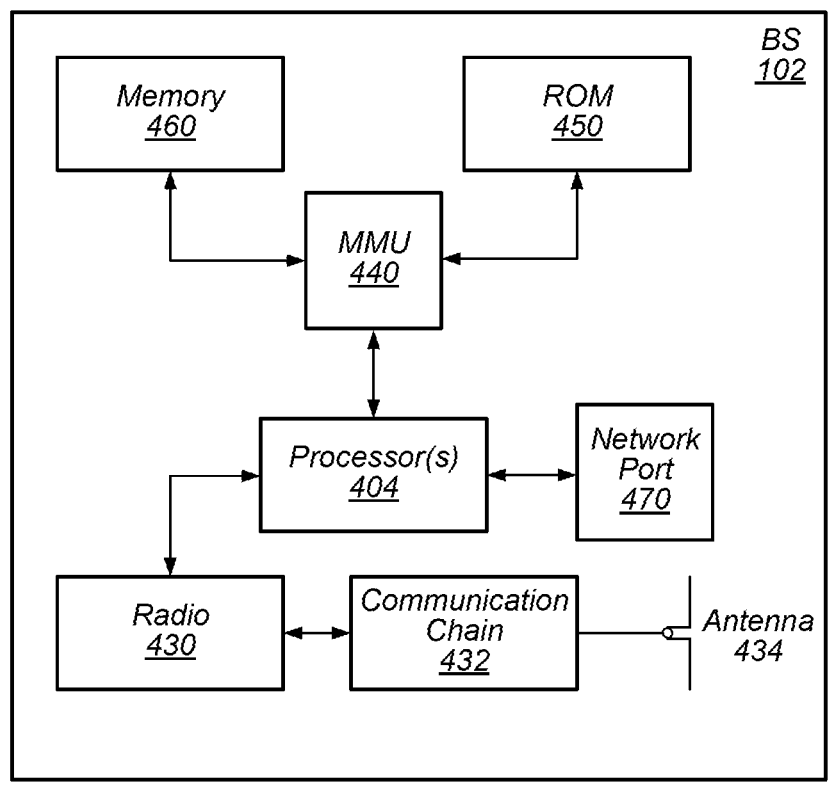
FIG. 4 illustrates an example block diagram of a BS according to some embodiments.

FIG. 4: Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs).

In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
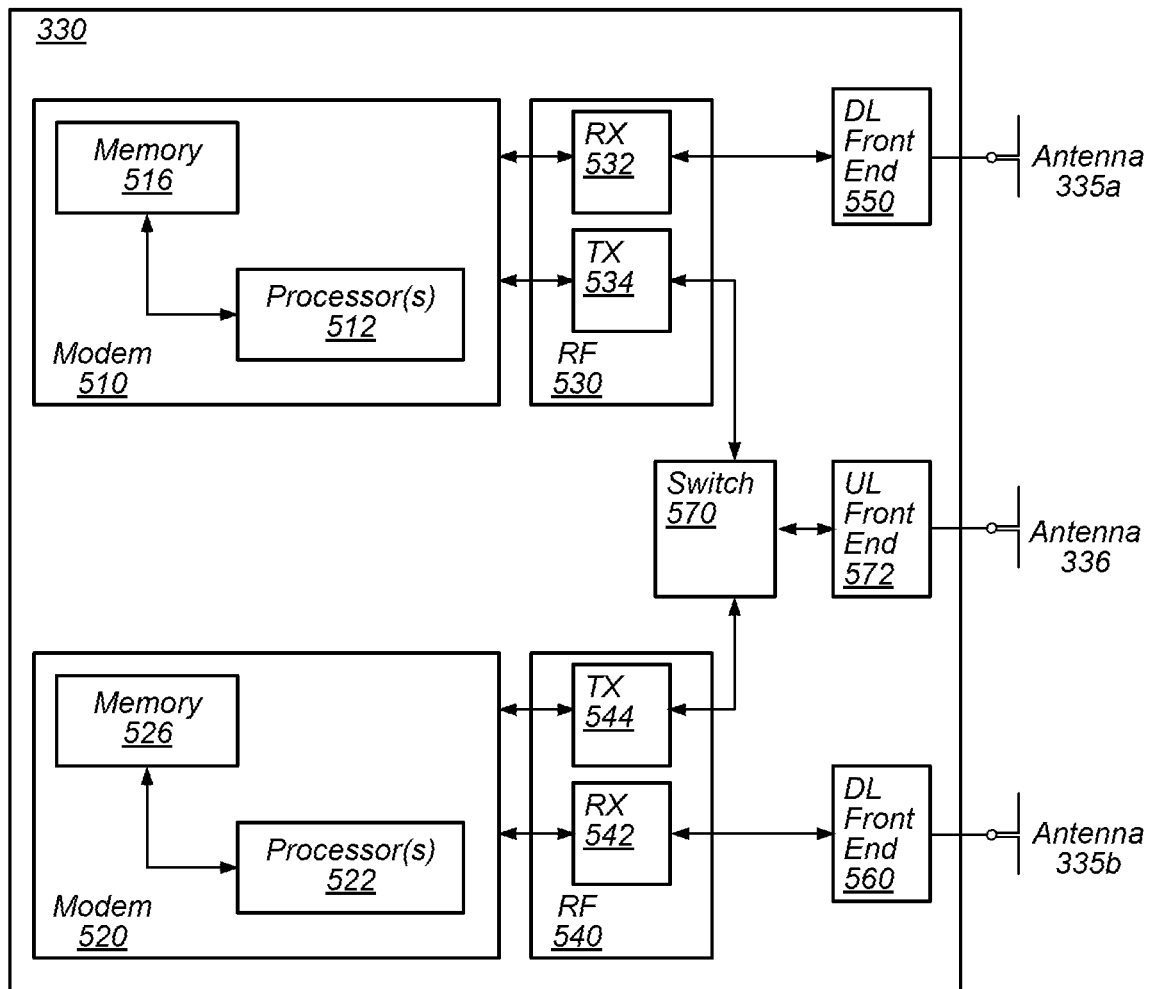
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for delivering paging to a first SIM of a multi-SIM UE while the multi-SIM UE is actively communicating with another SIM as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
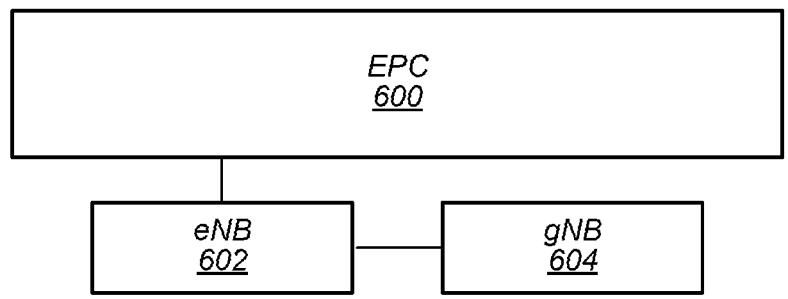
FIG. 6A illustrates an example of connections between an EPC network, an LTE base station (eNB), and a 5G NR base station (gNB).
Figure 6B:
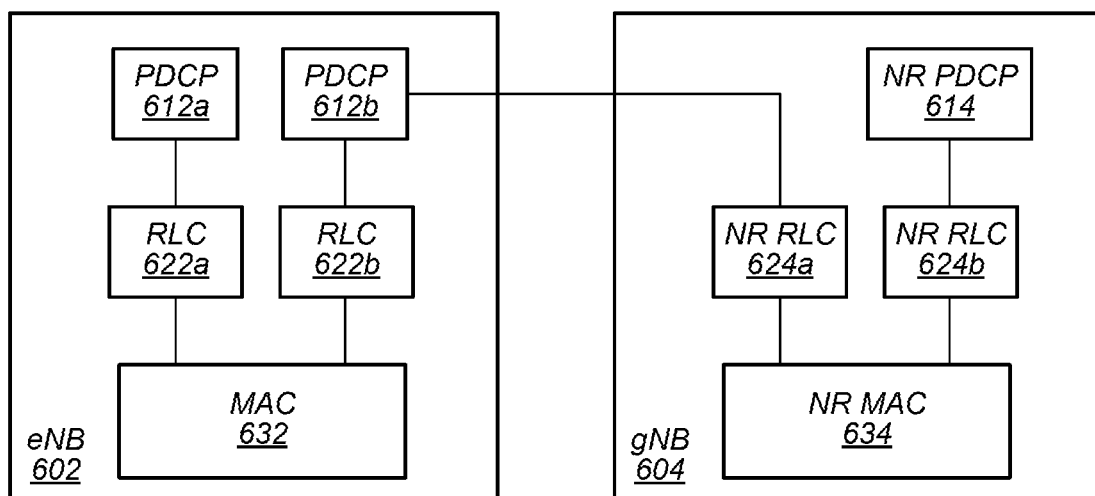
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
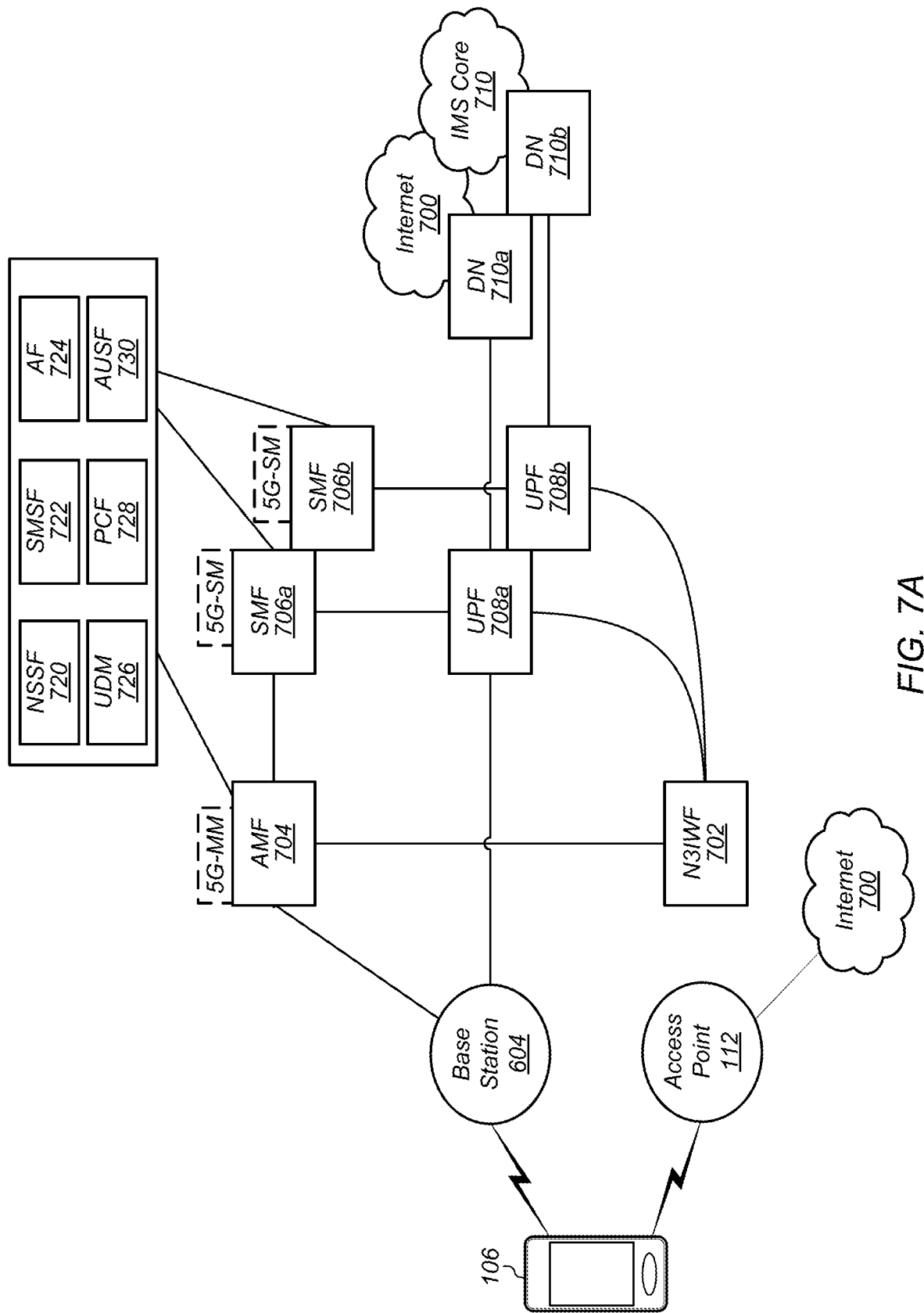
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
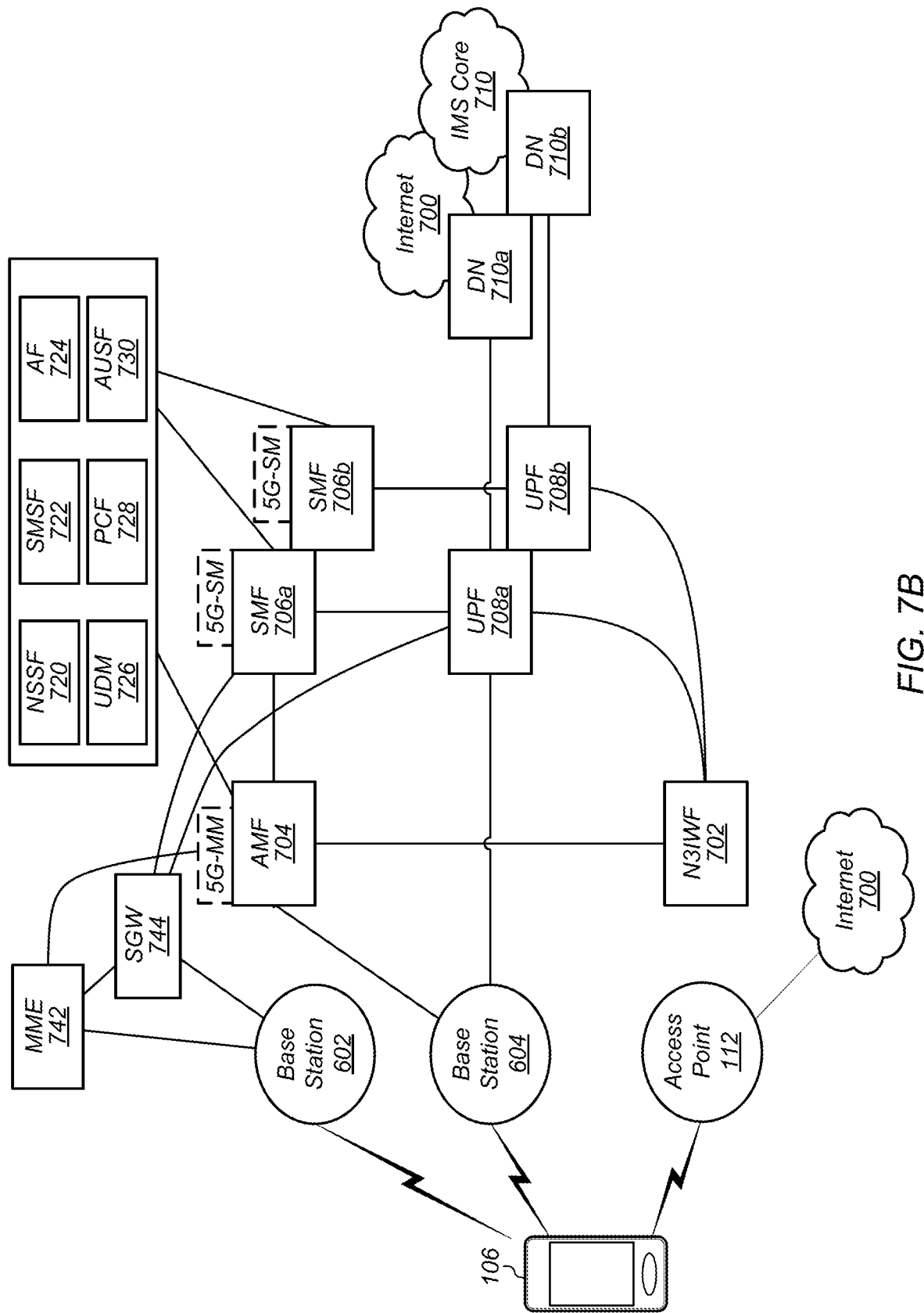
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to improve security checks in a 5G NR network, including mechanisms for delivering paging to a first SIM of a multi-SIM UE while the multi-SIM UE is actively communicating with another SIM, e.g., as further described herein.

Figure 8:
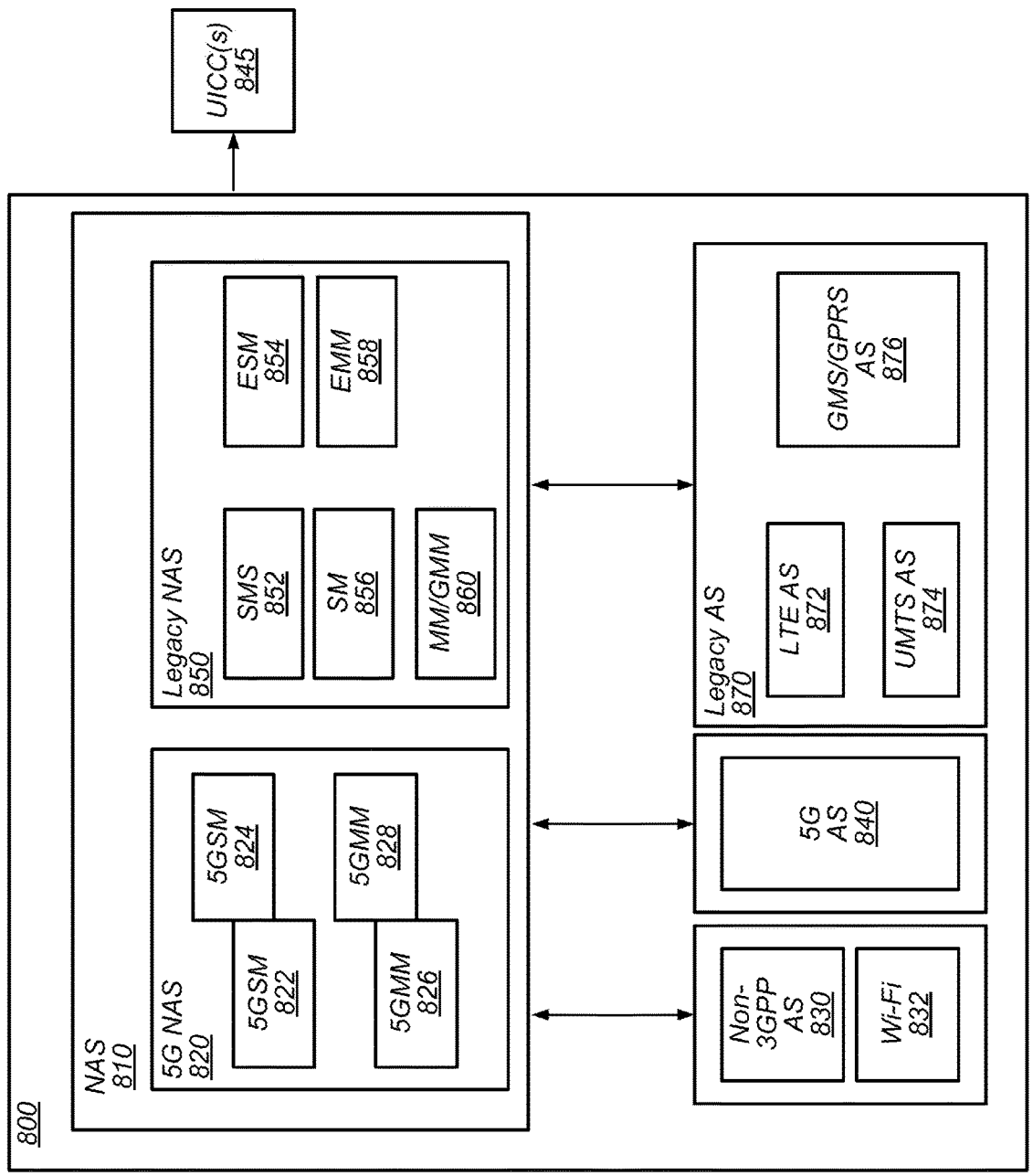
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for delivering paging to a first SIM of a multi-SIM UE while the multi-SIM UE is actively communicating with another SIM, e.g., as further described herein.

Multi-SIM Device Enhancements

In current implementations, a mobile station, such as a user equipment device (UE), may support more than one universal subscriber identity module (USIM) card, e.g., typically a UE may support at least two USIMs. In typical implementations, a multi-SIM (MU-SIM) UE, e.g., a UE that supports two or more USIMs, may support a user who wishes to use multiple subscriptions (e.g., a personal subscription and a business subscription and/or an individual subscription and a group subscription) on a single device. In such instances, USIMs may be from the same or different carriers (e.g., mobile network operators (MNOs). Typical implementations support various UE behaviors, such as dual SIM single standby (DSSS), dual SIM dual standby (DSDS), and/or dual SIM dual active (DSDA). In some implementations, a MU-SIM UE may use a common radio and baseband components shared among the multiple SIMs. However, such an architecture may lead to several issues that impact network performance.

For example, consider a MU-SIM UE that is actively engaged in communication within one or more networks (or systems). The MU-SIM UE, while actively communicating with a first network may be required to occasionally check another network (e.g., to read a paging channel, perform measurements, and/or receive network information). Such occasional activity on another network may have a performance impact, depending on configuration of the MU-SIM UE. For example, MU-SIM devices may have a higher probability of missing pages (e.g., as compared to single SIM UEs) due to paging collisions across SIMs, tune-aways, high priority procedure ongoing on another SIM, and so forth.

In current implementations, when a MU-SIM UE is connected to a first network and receives a page on a second network, the MU-SIM UE may be required to blindly decide whether to ignore the page or respond to the page. For example, when a MU-SIM UE is in CM-Connected state on a USIM A and performing active data transfer, the MU-SIM UE may periodically tune away to a USIM B and attempt to decode a page. However, the MU-SIM UE does not have visibility on what is the procedure for which the incoming page is being received; thus, there is a risk of the MU-SIM UE aborting a higher priority procedure on USIM A while tuning away to service a low priority procedure on USIM B.

As a further example, when a MU-SIM UE decides to respond to a page received on a second network (e.g., supported by USIM B) while connected to a first network (e.g., supported by USIM A) and/or when the MU-SIM UE is required to perform some signaling activity on the second network (e.g., such as a periodic mobility registration update), the MU-SIM UE may need to stop current activity on the first network. However, in the absence of any procedure for suspension of ongoing activity, the MU-SIM UE may have to autonomously release an RRC connection with the first network and abruptly leave which may be likely to be interpreted as an error case by the first network. Such an error case may have the potential to distort the statistics in the first network and algorithms that rely on them. Moreover, during the MU-SIM UE's absence, the first network may continue to page the MU-SIM UE which may result in waste of paging resources on the first network.

Embodiments described herein provide systems, mechanisms, and methods for enhancement of multi-SIM devices, such as UE 106. In some embodiments, a network may increase paging retries for known MU-SIM devices, e.g., based on an indication of capabilities from a MU-SIM device. In some embodiments, the indication may be via a network access stratum (NAS) registration request, a radio resource control (RRC) capability procedure, and/or an RRC UE assistance procedure. In some embodiments, a network may include, within a page, an indication of a paging priority and/or a paging cause to the UE. The UE may then determine a response to the page based, at least in part, on the indicated priority and/or the indicated paging cause. In some embodiments, the UE may indicate a tune-away to the network. The indication of the tune-away may include a cause for the tune-away. In some embodiments, the indication may be provided at an RRC level or a network access stratum (NAS) level.

For example, in some embodiments, a UE, such as UE 106, may provide an indication of a MU-SIM configuration via a NAS registration request. In some embodiments, as part of a 5GMM capability information element (IE) in a NAS registration request message, 1 bit may be reserved to indicate MU-SIM support. In some embodiments, an additional IE may be introduced to indicate public land mobile network (PLMN) information and/or carrier (or operator) name for each additional SIM included (and/or active) in the UE. In some embodiments, the UE may provide an option to allow a user to dynamically enable/disable secondary SIMs. In such embodiments, when the UE changes from a single SIM mode to a MU-SIM mode, or vice versa, the UE may perform a periodic registration request procedure, e.g., a periodic NAS registration request procedure, to update the MU-SIM capability along with the PLMN information and/or carrier information for activated SIMs (e.g., peer SIMs) to the network.

As another example, in some embodiments, a UE, such as UE 106, may provide an indication of a MU-SIM configuration via an RRC UE capability procedure. In some embodiments, as part of an RRC UE capability message, the UE may update a MU-SIM configuration as well as the PLMN information and/or carrier (or operator) name for each addition SIM included in the UE, e.g., to a network node, such as gNB 604. The network node may forward this information to an AMF via an N2 interface. In some embodiments, when the UE's device config changes from single SIM to MU-SIM, the UE may perform de-registration/re-registration procedures to update its SIM capabilities to the network. In some embodiments, the UE may trigger the network to request updated RRC capabilities in order to update its SIM capabilities.

As a further example, in some embodiments, a UE, such as UE 106, may provide an indication of a MU-SIM configuration via an RRC UE assistance procedure. In some embodiments, as part of an RRC UE assistance message, the UE may update its MU-SIM configuration as well as the PLMN information and/or carrier (or operator) name for each addition SIM included in the UE e.g., to a network node, such as gNB 604. The network node may forward this information to an AMF via an N2 interface. In some embodiments, the UE may trigger the network to request updated RRC capabilities in order to update its SIM capabilities.

In some embodiments, as part of a request paging procedure from an AMF, such as AMF 704, to a RAN, the AMF may include a paging cause (or paging category) field. A page may be initiated in support of various services, such as a voice over LTE (VoLTE) call, a voice over NR (VoNR) call, an emergency callback, a short message service (SMS), a voice mail, a voice over IP (VoIP) call, slice specific data, services for background data, a video call, network signaling (e.g., UE configuration update when UE is not in a connected mode), user perceivable incoming push, and so forth. Thus, the AMF may include a paging cause (or paging category) when paging a UE, such as UE 106. In some embodiments, operators may define how to prioritize paging causes. For example, FIG. 9A illustrates an example of paging categories/causes and associated rules (or priority rank), according to some embodiments. As shown, an emergency callback may have a highest priority and thus, a lowest associated rule. Additionally, a VoLTE or VoNR call may have a higher priority than other paging causes except an emergency callback. In some embodiments, paging categories (or causes) may aid an AMF and/or UE in determining how to respond to a page.

In some embodiments, as part of the determination of how to respond to a page, a UE, such as UE 106, may follow a set of precedence rules. For example, as illustrated by FIG. 9B, in some embodiments, services may be categorized as either long or short procedures and as either low or high priority. As shown, long, high priority services may include voice calls and/or emergency calls whereas short, high priority services may include network access stratum (NAS) signaling and/or SMS data. Additionally, long, low priority services may include software updates and/or background traffic whereas short, low priority services may include slice specific updates and/or operator defined traffic. In some embodiments, a set of precedence rules may define long, high priority procedures as having a highest precedence, followed by short, high priority procedures, short, low priority procedures, and long, low priority procedures.

Figure 10A:
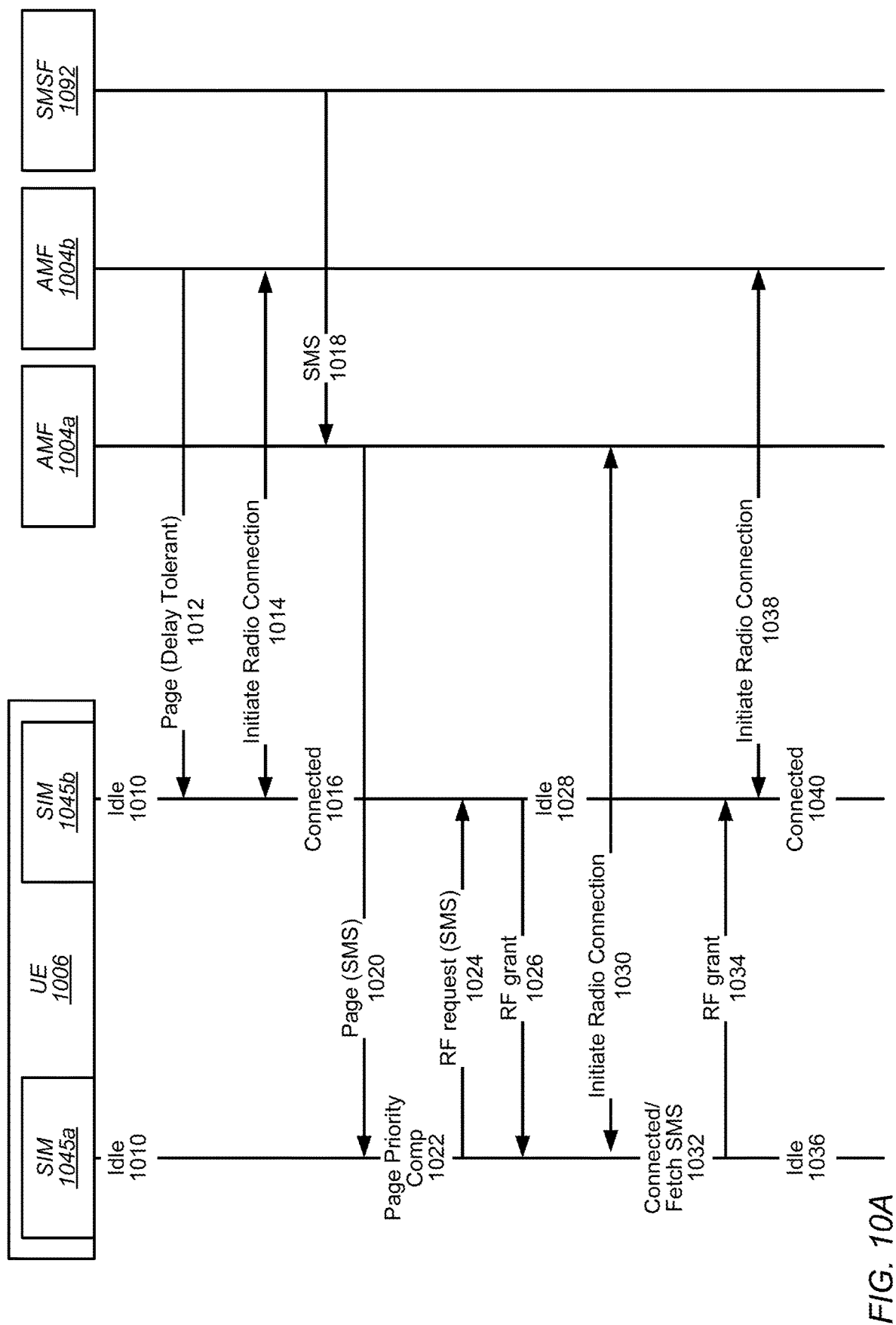
FIGS. 10A and 10B illustrate block diagrams of examples of signaling between a UE and a network for priority-based paging, according to some embodiments.
Figure 10B:
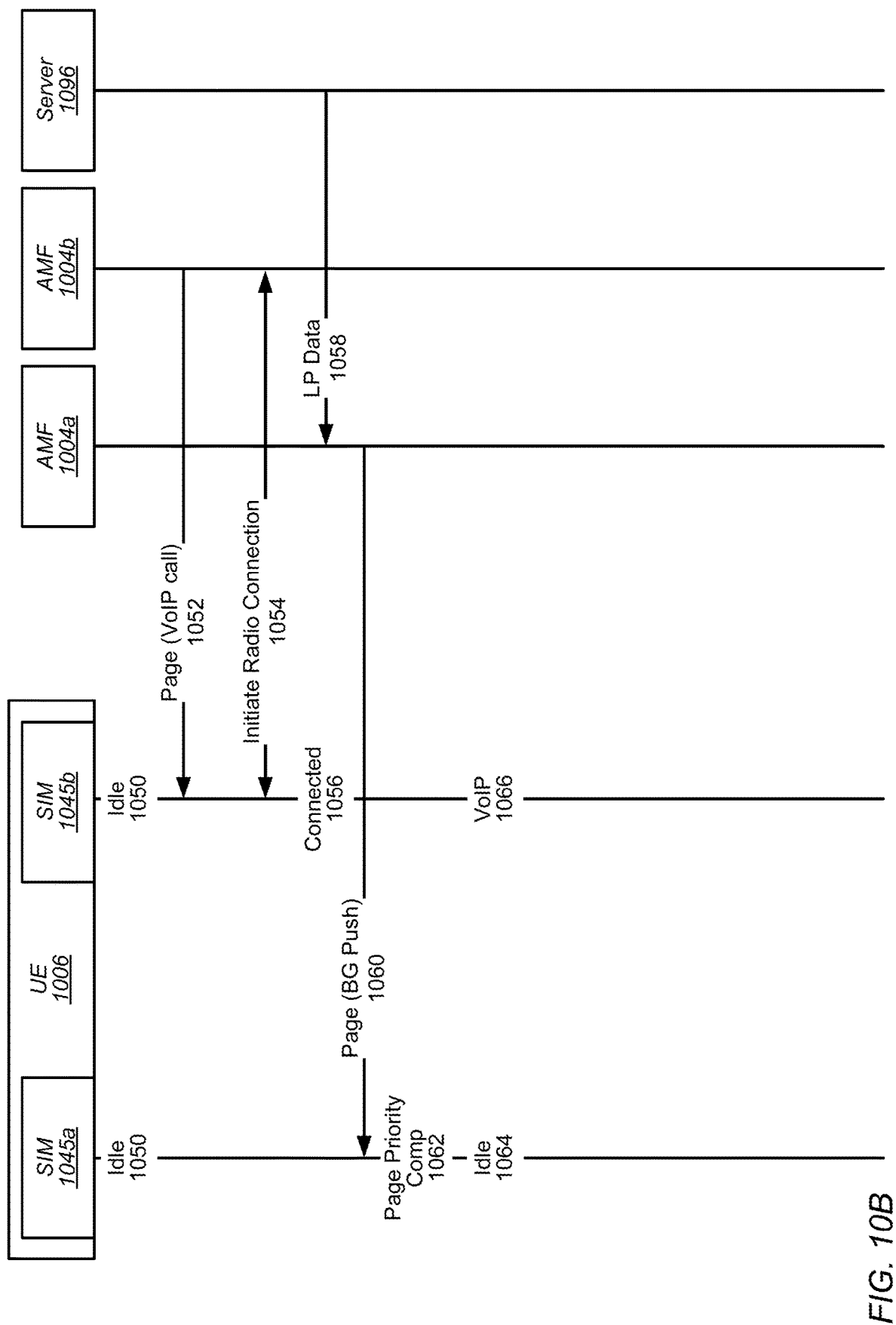

FIGS. 10A and 10B illustrate block diagrams of examples of signaling between a UE and a network for priority-based paging, according to some embodiments. The signaling shown in FIGS. 10A and 10B may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may operate as follows.

For example, as shown in FIG. 10A, a UE 1006, which may be a UE 106, may include one or more UICCs, such as SIMs 1045a and 1045b. At 1010, connections supported by SIMs 1045a and 1045b may be in an idle mode with respective access and mobility management functions (AMFs) 1004a and 1004b. The AMFs 1004a and 1004b, which may be AMFs 704, may be connected to a short message service function (SMSF) 1092, which may be an SMSF 722. At 1012, AMF 1004b may transmit a page to UE 1006 intended for SIM 1045b. The page may include an indication (or cause) that the page is delay tolerant (e.g., not high priority and/or is a low priority page). At 1014, responsive to the page, the UE 1006 may initiate a radio connection supported by SIM 1045b. At 1016, a connection supported by SIM 1045b may transition to a connected state. At 1018, AMF 1004a may receive an SMS indication from 1096. At 1020, the AMF 1004a, in response to the SMS indication, may transmit a page to the UE 1006 intended for SIM 1045a. The page may indicate a cause as SMS. At 1022, the UE 1006 may compare priority (or precedence) of the received pages. The UE 1006, based on a set of rules (e.g., as described herein), may determine that SMS service is of higher priority than the delay tolerant page. Thus, at 1024, SIM 1045a may request RF resources from SIM 1045b. The request for RF resources may include an indication of a cause (or reason for the request), in this case, SMS page. At 1026, SIM 1045b may grant the RF resource request and, at 1028, a connection supported by SIM 1045b may transition to idle mode. At 1030, the connection supported by SIM 1045a may initiate a radio connection with AMF 1004a. At 1032, once connected, the UE may fetch (or receive) the SMS from AMF 1004a. At 1034, SIM 1045a may grant RF resources back to SIM 1045b and, at 1036, the connection supported by SIM 1045a may transition back to idle mode. At 1038, SIM 1045b may initiate a radio connection with AMF 1004b and transition back to a connected mode at 1040.

As another example, as shown in FIG. 10B, at 1050, connections supported by SIMs 1045a and 1045b may be in an idle mode with respective AMFs 1004a and 1004b. The AMFs 1004a and 1004b may be in communication with one or more servers, such as server 1096. At 1052, AMF 1004b may transmit a page to UE 1006 intended for SIM 1045b. The page may include an indication (or cause) that the page is for a voice over IP (VoIP call). At 1054, responsive to the page, the UE 1006 may initiate a radio connection supported by SIM 1045b. At 1056, a connection supported by SIM 1045b may transition to a connected state. At 1058, AMF 1004a may receive an indication from server 1096 that low priority (LP) data is available for the UE via a connection supported by SIM 1045a. At 1060, the AMF 1004a, in response to the LP data indication, may transmit a page to the UE 1006 intended for SIM 1045a. The page may indicate a cause as low priority data (e.g., a background push of data). At 1062, the UE 1006 may compare priority (or precedence) of the received pages. The UE 1006, based on a set of rules (e.g., as described herein), may determine that the LP data is of lower priority than the VoIP page. Thus, at 1064, SIM 1045a may remain in idle mode and the VoIP call, supported by SIM 1045b, may continue at 1066.

In some embodiments, an AMF, such as AMF 704, may base a paging cause on an active procedure with a highest priority. For example, a typical paging mechanism is that a network may retry a page "x" times with a gap of "y" seconds (or minutes). Thus, a complete paging procedure may span between approximately 20 to 100 seconds, e.g., depending on network paging retry logic. However, during the duration of a paging procedure, a cause associated with the paging procedure may change, e.g., from a lower priority cause (e.g., a background data push) to a higher priority cause (e.g., an incoming VoLTE or VoNR call). Thus, embodiments described herein provides mechanism to dynamically change (or update) a paging cause during a paging re-transmission (or paging re-try). Such mechanisms may allow a UE to better determine how to respond to a page.

In some embodiments, a DSCP marking in an IP header may be utilized for indicating a priority of a page (and/or for indicating a high priority page). Note that a DSCP (differentiated services code point) may be defined as a 6-bit field used to identify a level of service a packet receives in a network (and may be a 3-bit expansion of an IP precedence with elimination of type of service (ToS) bits). Note further, applications may typically set DSCP marking for critical (e.g., high priority) incoming packets. In some embodiments, a UPF, such as UPFs 708, may provide such a "hint" to an AMF to utilize indicating a paging cause as high priority data.

In some embodiments, a UE, such as UE 106, may signal to a network (e.g., to an AMF, such AMF 704, of the network), an indication of a tune-away from a current connection (supported by a first SIM) to another connection (e.g., a connection supported by an additional SIM). The UE may perform registration with the network at the end of the tune-away. In some embodiments, a tune-away indication may be limited (or restricted) to procedures that the UE expects to last longer than a pre-defined threshold amount of time. In other words, the UE may provide the tune-away indication for procedures lasting longer than a specified amount of time. In some embodiments, the AMF may block any page of lower priority than a priority indicated by the tune-away indication until receiving a tune-away indication indicating an end of the tune-away, receiving a new radio connection request from the first SIM, and/or upon expiration of a tune-away timer.

Figure 11A:
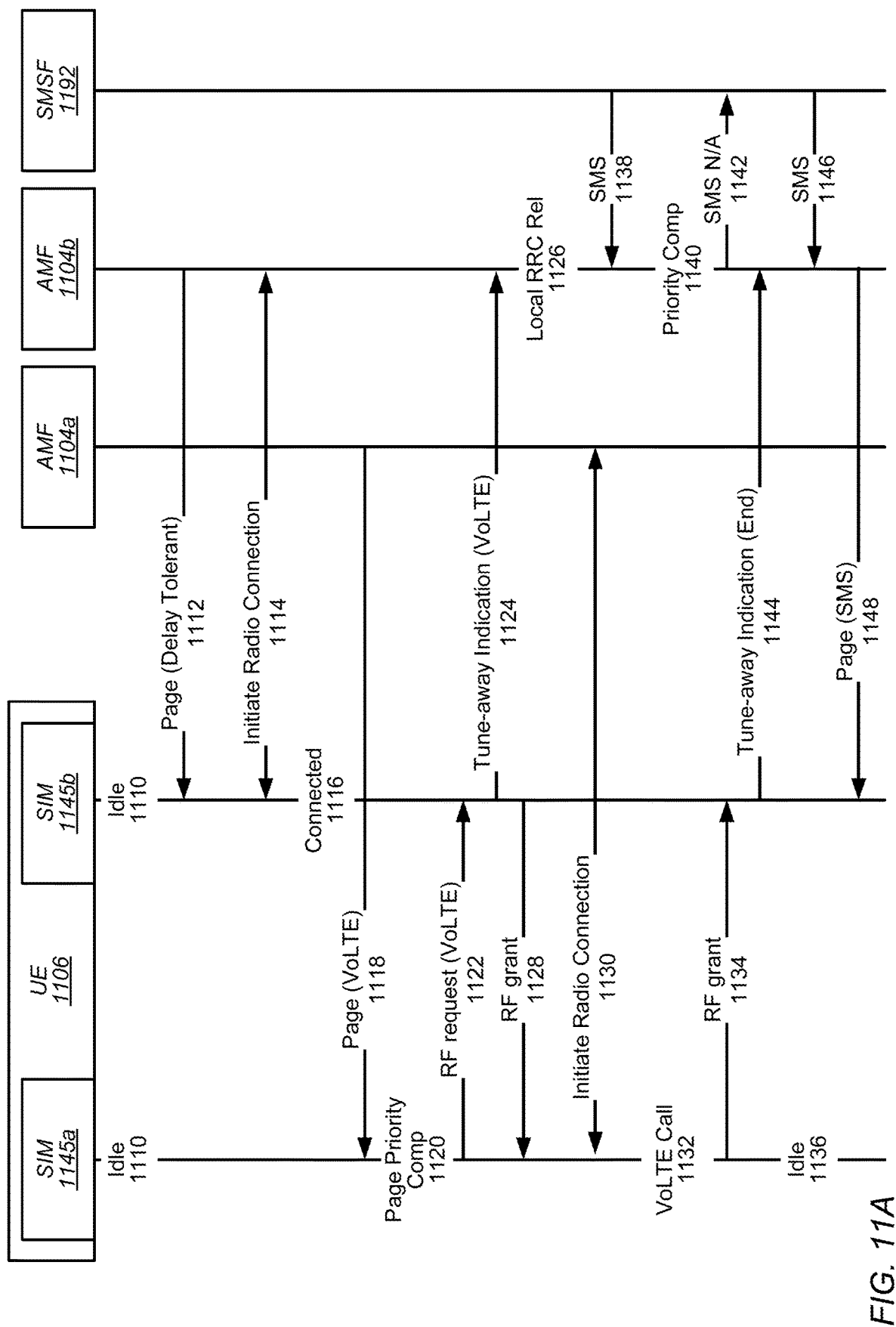
FIG. 11A illustrates a block diagram of an example of signaling between a UE and a network for a low priority page, according to some embodiments.
Figure 11B:
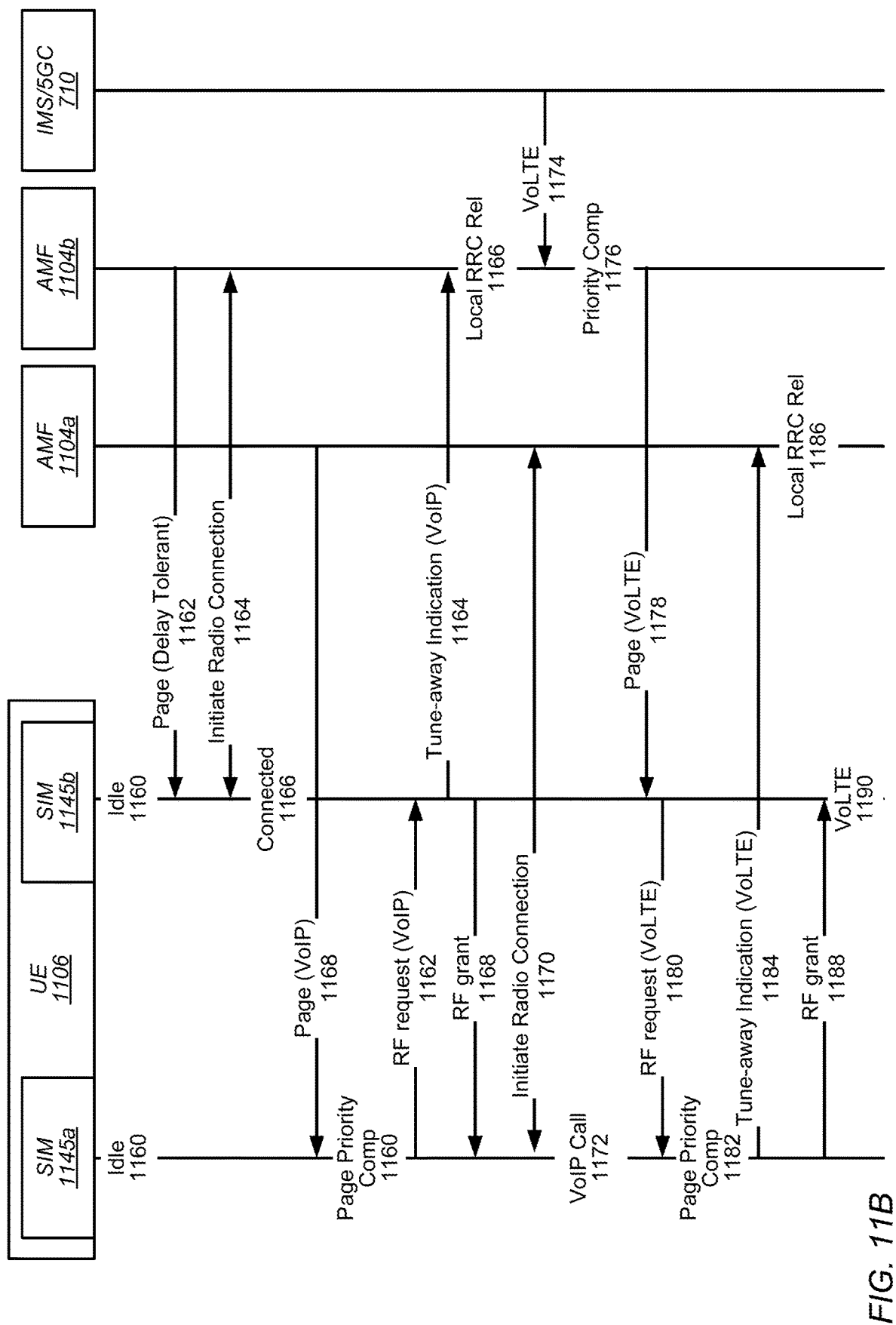
FIG. 11B illustrates a block diagram of an example of signaling between a UE and a network for a high priority page, according to some embodiments.
Figure 12:
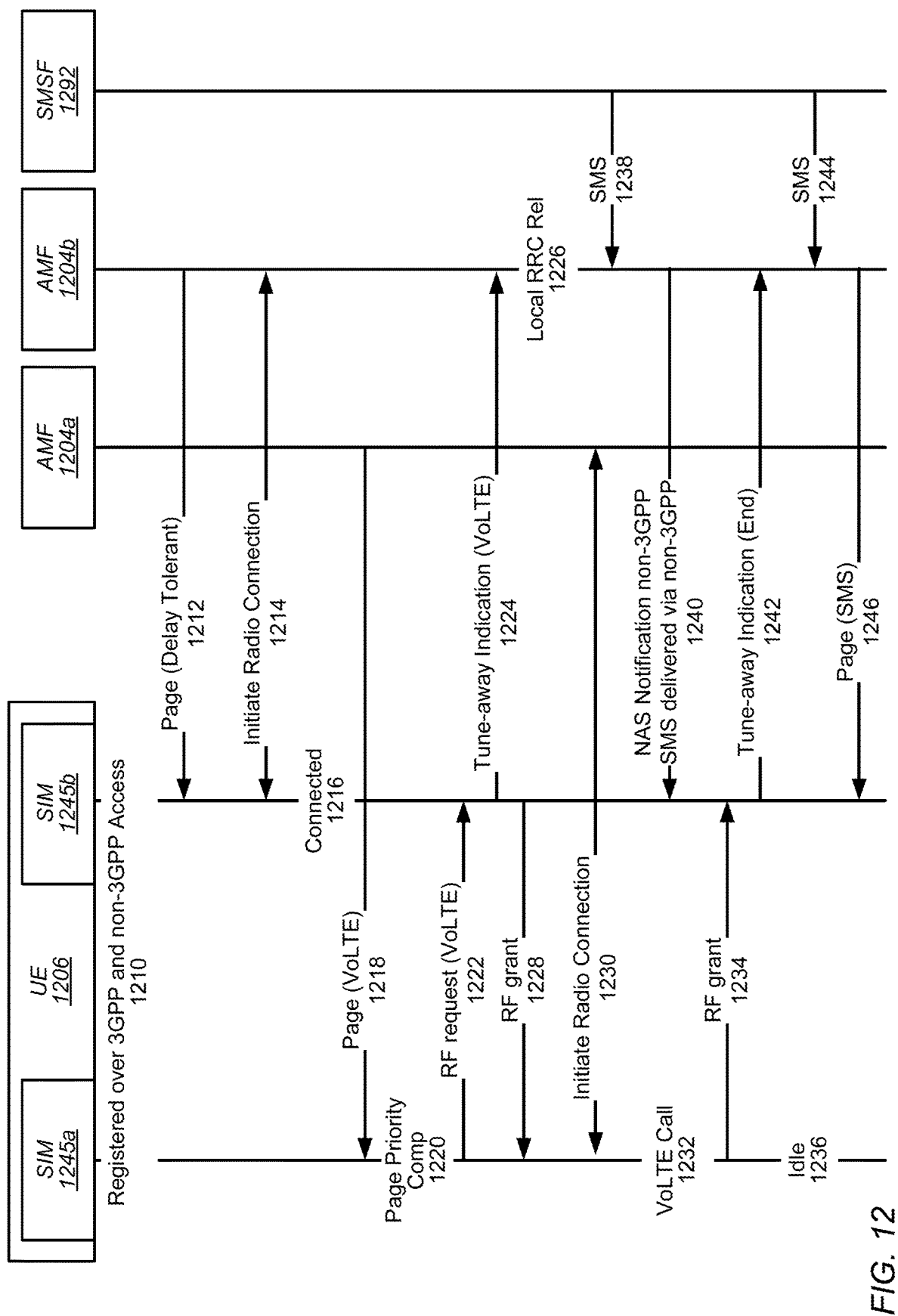
FIG. 12 illustrates another block diagram of an example signaling between a UE and a network for a low priority page, according to some embodiments.
Figure 13:
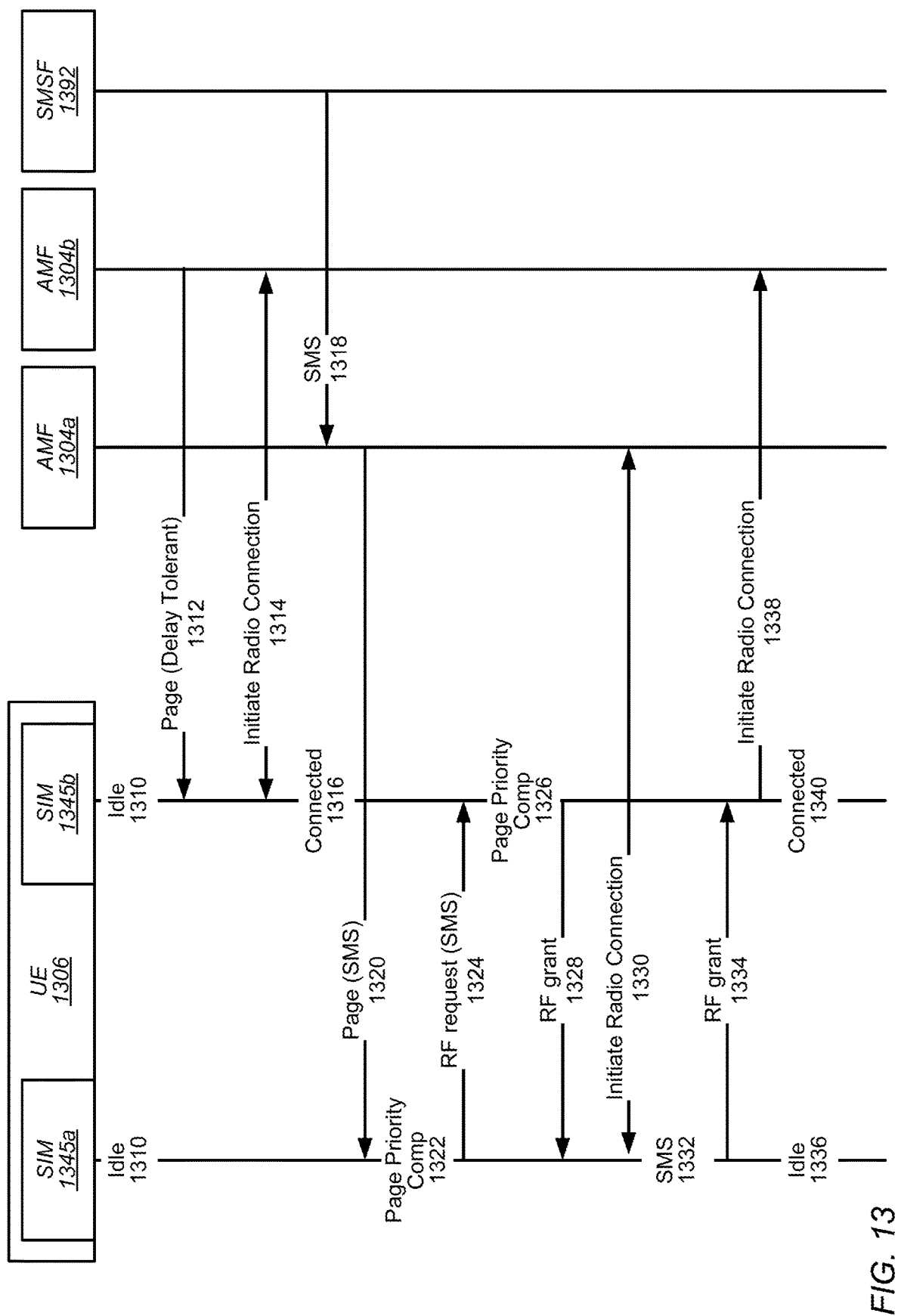
FIG. 13 illustrates a block diagram of an example of signaling between a UE and a network for a short procedure, according to some embodiments.

For example, FIGS. 11A, 11B, 12, and 13 illustrate examples of tune-away indications for low and high priority procedures, according to some embodiments. In particular, FIGS. 11A and 12 illustrate block diagrams of examples of signaling between a UE and a network for a low priority page, according to some embodiments, whereas FIG. 11B illustrates a block diagram of an example of signaling between a UE and a network for a high priority page, according to some embodiments. Additionally, FIG. 13 illustrates a block diagram of an example of signaling between a UE and a network for a short procedure, according to some embodiments. The signaling shown in FIGS. 11A, 11B, 12 and 12 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may operate as follows.

For example, as shown in FIG. 11A, a UE 1106, which may be a UE 106, may include one or more UICCs, such as SIMs 1145a and 1145b. At 1110, connections supported by SIMs 1145a and 1145b may be in an idle mode with respective access and mobility management functions (AMFs) 1104a and 1104b. The AMFs 1104a and 1104b, which may be AMFs 704, may be connected to a short message service function (SMSF) 1192, which may be an SMSF 722. At 1112, AMF 1104b may transmit a page to UE 1106 intended for SIM 1145b. The page may include an indication (or cause) that the page is delay tolerant (e.g., not high priority and/or is a low priority page). At 1114, responsive to the page, the UE 1106 may initiate a radio connection supported by SIM 1145b. At 1116, a connection supported by SIM 1145b may transition to a connected state. At 1118, AMF 1104a may transmit a page to UE 1106 intended for SIM 1145a. The page may include an indication (or cause) that the page is for a voice call, such as a VoLTE or VoNR call. At 1120, the UE 1106 may compare priority (or precedence) of the received pages. The UE 1106, based on a set of rules (e.g., as described herein), may determine that the voice call service is of higher priority than the delay tolerant page. Thus, at 1122, SIM 1145a may request RF resources from SIM 1145b. The request for RF resources may include an indication of a cause (or reason for the request), in this case, a voice call. At 1124, SIM 1145b may determine that a tune-away indication is necessary based on a cause (e.g., voice call for SIM 1145a) of the tune-away and transmit a tune-away indication, with cause, to AMF 1104b. Upon receipt of the tune-away indication, AMF 1104b may locally release the CM-Connection and subsequently inform a base station, such as base station 102, perform a local RRC release of the connection with UE 106 at 1126. Additionally, at 1128, SIM 1145b may grant the RF resource request. At 1130, the connection supported by SIM 1145a may initiate a radio connection with AMF 1104a. At 1132, once connected, the UE may perform the voice call. At 1134, upon completion of the voice call, SIM 1145a may grant RF resources back to SIM 1145b and, at 1136, the connection supported by SIM 1145a may transition back to idle mode. Additionally, at 1138, AMF 1104b may receive an SMS indication from SMSF 1192. At 1140, AMF 1104b may compare the priority of the SMS indication with a cause of the tune-away (e.g., included in the tune-away indication). Upon determining that the SMS is of lower priority than the cause of the tune-away (voice call), AMF 1104b may, at 1142, inform SMSF 1192 that SMS is not available. At 1144, SIM 1145b may transmit a tune-away indication that indicates an end of the tune-away. At 1146, the AMF 1104b may receive a (either retry or new) SMS indication from SMSF 1192. At 1148, AMF 1104b may page UE 1106 with an indication of an SMS for a connection supported by SIM 1145b.

As another example, as shown in FIG. 11B, at 1150, connections supported by SIMs 1145a and 1145b may be in an idle mode with respective AMFs 1104a and 1104b. The AMFs 1104a and 1104b may be in communication with IMS/5G core 710. At 1152, AMF 1104b may transmit a page to UE 1106 intended for SIM 1145b. The page may include an indication (or cause) that the page is delay tolerant (e.g., not high priority and/or is a low priority page). At 1154, responsive to the page, the UE 1106 may initiate a radio connection supported by SIM 1145b. At 1156, a connection supported by SIM 1145b may transition to a connected state. At 1158, AMF 1104a may transmit a page to UE 1106 intended for a connection supported by SIM 1145a. The page may include an indication of an incoming VoIP call. At 1160, the UE 1106 may compare priority (or precedence) of the received pages. The UE 1106, based on a set of rules (e.g., as described herein), may determine that the delay tolerant page is of lower priority than the VoIP page. Thus, at 1164, SIM 1145a may remain in idle mode and the VoIP call, supported by SIM 1145b, may continue at 1166. Thus, at 1162, SIM 1145a may request RF resources from SIM 1145b. The request for RF resources may include an indication of a cause (or reason for the request), in this case, a VoIP call. At 1164, SIM 1145b may determine that a tune-away indication is necessary based on a cause (e.g., VoIP call for SIM 1145*a*) of the tune-away and transmit a tune-away indication, with cause, to AMF 1104*b*. Upon receipt of the tune-away indication, AMF 1104*b* may perform a local CM connection release of the connection with UE 106 and subsequently inform a base station, such as base station 102, to locally release RRC connection at 1166. Additionally, at 1168, SIM 1145*b* may grant the RF resource request. At 1170, the connection supported by SIM 1145*a* may initiate a radio connection with AMF 1104*a*. At 1172, once connected, the UE may perform the VoIP call. At 1174, AMF 1104*b* may receive an indication of an incoming voice call (e.g., a VoLTE or VoNR call) from IMS/5G core 710. At 1176, AMF 1104*b* may compare the priority of the voice call indication with a cause of the tune-away (e.g., included in the tune-away indication). Upon determining that the voice call is of higher priority than the cause of the tune-away (VoIP call), AMF 1104*b* may, at 1178, may page UE 106 with a paging indication of voice call for SIM 1145*b*. At 1180, upon receiving the page from AMF 1104*b*, SIM 1145*b* may request RF resources from SIM 1145*a*. At 1182, the UE 1106 may compare priority (or precedence) of the received pages. The UE 1106, based on a set of rules (e.g., as described herein), may determine that the VoIP page is of lower priority than the voice call page. At 1184, SIM 1145*a* may determine that a tune-away indication is necessary based on a cause (e.g., voice call for SIM 1145*b*) of the tune-away and transmit a tune-away indication, with cause (e.g., voice call), to AMF 1104*a*. Upon receipt of the tune-away indication, AMF 1104*a* may perform a local RRC release of the connection with UE 106 at 1186. Additionally, at 1188, SIM 1145*a* may grant the RF resource request. At 1190, the UE 1106 may perform the voice call over the connection supported by SIM 1145*b*.

As a further example, as shown in FIG. 12, a UE 1206, which may be a UE 106, may include one or more UICCs, such as SIMs 1245*a* and 1245*b*. At 1210, connections supported by SIMs 1245*a* and 1245*b* may be in an idle mode with respective access and mobility management functions (AMFs) 1204*a* and 1204*b*. In addition, the connections may be registered over both 3GPP (e.g., cellular) access and non-3GPP (e.g., non-cellular) access. The AMFs 1204*a* and 1204*b*, which may be AMFs 704, may be connected to a short message service function (SMSF) 1296, which may be an SMSF 722. At 1212, AMF 1204*b* may transmit a page to UE 1206 intended for SIM 1245*b*. The page may include an indication (or cause) that the page is delay tolerant (e.g., not high priority and/or is a low priority page). At 1214, responsive to the page, the UE 1206 may initiate a radio connection supported by SIM 1245*b*. At 1216, a connection supported by SIM 1245*b* may transition to a connected state. At 1218, AMF 1204*a* may transmit a page to UE 1206 intended for SIM 1245*a*. The page may include an indication (or cause) that the page is for a voice call, such as a VoLTE or VoNR call. At 1220, the UE 1206 may compare priority (or precedence) of the received pages. The UE 1206, based on a set of rules (e.g., as described herein), may determine that the voice call service is of higher priority than the delay tolerant page. Thus, at 1222, SIM 1245*a* may request RF resources from SIM 1245*b*. The request for RF resources may include an indication of a cause (or reason for the request), in this case, a voice call. At 1224, SIM 1245*b* may determine that a tune-away indication is necessary based on a cause (e.g., voice call for SIM 1245*a*) of the tune-away and transmit a tune-away indication, with cause, to AMF 1204*b*. Upon receipt of the tune-away indication, AMF 1204*b* may inform a base station, such as base station 102, to perform a local RRC release of the connection with UE 106 at 1226. Additionally, at 1228, SIM 1245*b* may grant the RF resource request. At 1230, the connection supported by SIM 1245*a* may initiate a radio connection with AMF 1204*a*. At 1232, once connected, the UE may perform the voice call. At 1234, upon completion of the voice call, SIM 1245*a* may grant RF resources back to SIM 1245*b* and, at 1236, the connection supported by SIM 1245*a* may transition back to idle mode. Additionally, at 1238, AMF 1204*b* may receive an SMS indication from SMSF 1292. At 1240, AMF 1204*b* may determine that that the SMS procedure is of a lower priority than the voice call, and thus, may deliver a NAS notification over non-3GPP access that may include the SMS. Thus, the UE may receive the SMS intended for SIM 1245*b* over non-3GPP access during the tune-away. At 1242, SIM 1245*b* may transmit a tune-away indication that indicates an end of the tune-away. At 1246, the AMF 1204*b* may receive another (or retry) SMS indication from SMSF 1292. At 1248, AMF 1204*b* may page UE 1206 with an indication of an SMS for a connection supported by SIM 1245*b* over 3GPP access.

As yet another example, as shown in FIG. 13, a UE 1306, which may be a UE 106, may include one or more UICCs, such as SIMs 1345*a* and 1345*b*. At 1310, connections supported by SIMs 1345*a* and 1345*b* may be in an idle mode with respective access and mobility management functions (AMFs) 1304*a* and 1304*b*. The AMFs 1304*a* and 1304*b*, which may be AMFs 704, may be connected to a short message service function (SMSF) 1392, which may be an SMSF 722. At 1312, AMF 1304*b* may transmit a page to UE 1306 intended for SIM 1345*b*. The page may include an indication (or cause) that the page is delay tolerant (e.g., not high priority and/or is a low priority page). At 1314, responsive to the page, the UE 1306 may initiate a radio connection supported by SIM 1345*b*. At 1316, a connection supported by SIM 1345*b* may transition to a connected state. At 1318, AMF 1304*a* may receive an SMS indication from SMSF 1392. Responsive to the indication, AMF 1304*a* may transmit a page to UE 1306 intended for SIM 1345*a* at 1320. The page may include an indication (or cause) that the page is for an SMS. At 1322, the UE 1306 may compare priority (or precedence) of the received pages. The UE 1306, based on a set of rules (e.g., as described herein), may determine that the SMS service is of higher priority than the delay tolerant page. Thus, at 1324, SIM 1345*a* may request RF resources from SIM 1345*b*. The request for RF resources may include an indication of a cause (or reason for the request), in this case, a SMS service. At 1326, SIM 1345*b* may determine that a tune-away indication is not necessary based on a cause (e.g., SMS service for SIM 1345*a* which is expected to be a short procedure) of the tune-away and, at 1328, SIM 1345*b* may grant the RF resource request. At 1330, the connection supported by SIM 1345*a* may initiate a radio connection with AMF 1304*a*. At 1332, once connected, the UE may receive the SMS. At 1334, SIM 1345*a* may grant RF resources back to SIM 1345*b* and, at 1336, the connection supported by SIM 1345*a* may transition back to idle mode. Additionally, at 1338, the UE 1306 may initiate a radio connection supported by SIM 1345*b*. At 1340, a connection supported by SIM 1345*b* may transition back to the connected state.

As described herein, in some embodiments, after a tune-away, a UE, such as UE 106, may be required to perform registration and setup of a new RRC connection. However, such a procedure may cause a delay in set up of a protocol data unit (PDU) session. Hence, in some embodiments, the UE may signal to a network an indication of the tune away (e.g., as described herein) and suspend the PDU session(s)

for a pre-determined (or pre-specified) duration. In some embodiments, the UE may transmit a "PDU Session Modification Request" as defined in 3GPP TS 24.501 v.16.2.0 Table 8.3.7.1.1 with a "Suspend notification IE" and a timer. The network may accept the request and store the UE's context. The network may then send a "PDU Session Modification command" with a unique temporary identifier (e.g., an I-RNTI) which the UE may use when resuming the PDU session. Alternatively, in some embodiments, if (and/or when) there are multiple PDU sessions to suspend at the same time, the UE may send a single NAS message to the AMF. The NAS message may indicate a list of PDU session IDs which may need to be suspended. In some embodiments, when (and/or if) a particular PDU session is suspended, the UPF may discard any incoming data on that PDU session. In some embodiments, an RM state may continue to be maintained as RM-REGISTERED and a CM state may continue to be maintained as CM-CONNECTED. In some embodiments, the UE may transmit a "PDU Session Modification Command" with "Resume Notification IE" when/if tuning back prior to expiration of the pre-determined duration. In some embodiments, when/if the tune-away exceeds the pre-determined duration, the network and the UE may reset the UE context, move to IDLE state, and delete the I-RNTI. In such instances, the UE may perform a registration procedure followed by a PDU session establishment request to establish a new PDU session upon tuning back.

Figure 14:
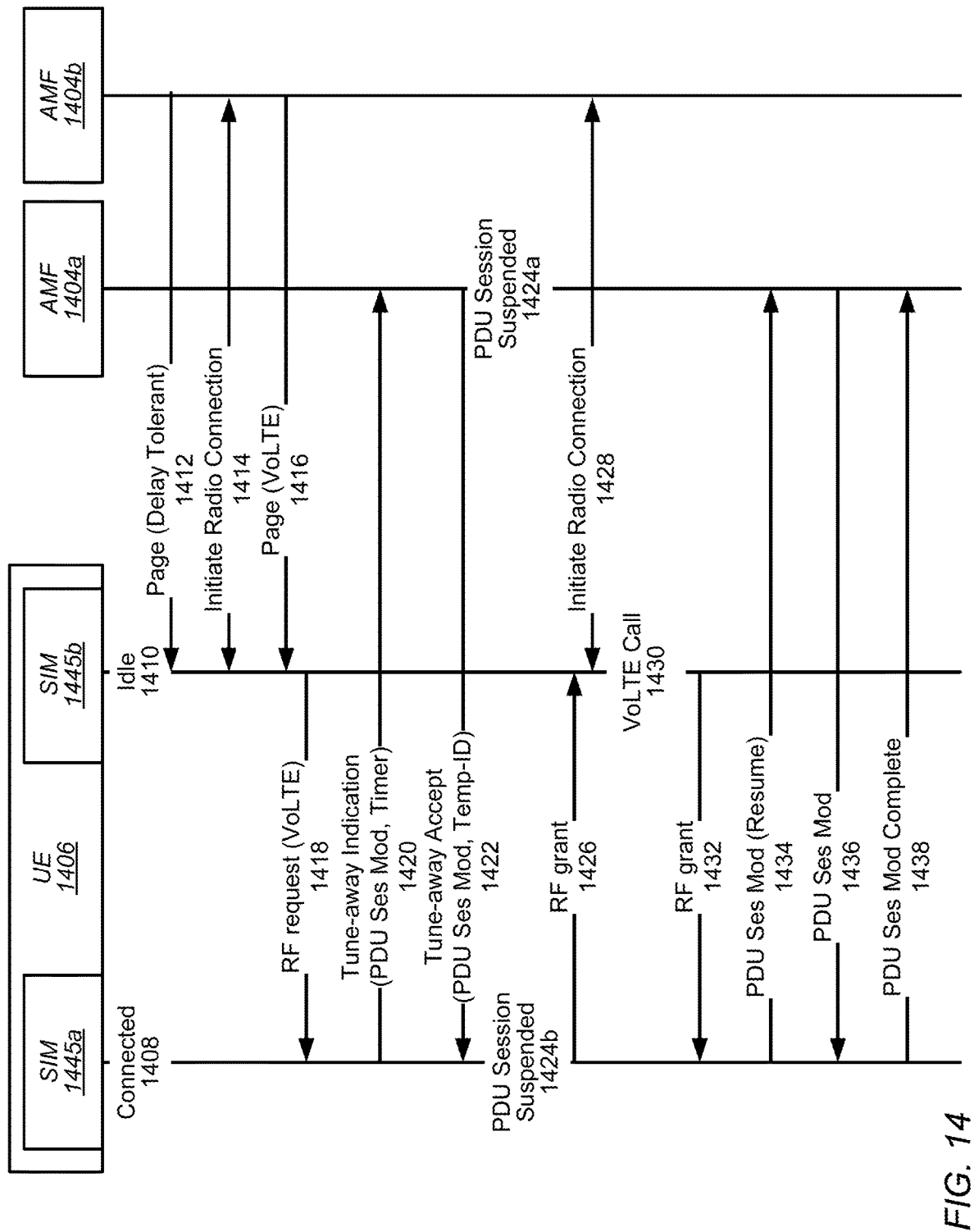
FIG. 14 illustrates a block diagram of an example of signaling between a UE and a network for a tune-away indication via a NAS message, according to some embodiments.

For example, FIG. 14 illustrates an example of a tune-away indication via a NAS message, according to some embodiments. The signaling shown in FIG. 14 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may operate as follows.

As shown, a UE 1406, which may be a UE 106, may include one or more UICCs, such as SIMs 1445*a* and 1445*b*. At 1408, a connection supported by SIM 1445*a* may be in a connected mode and, at 1410, a connection supported by SIM 1445*b* may be in an idle mode with respective access and mobility management functions (AMFs) 1404*a* and 1404*b*. The AMFs 1404*a* and 1404*b*, which may be AMFs 704, may be connected to various functions within the network, such as an SMSF and/or an IMS/5G core. At 1412, AMF 1404*b* may transmit a page to UE 1406 intended for SIM 1445*b*. The page may include an indication (or cause) that the page is delay tolerant (e.g., not high priority and/or is a low priority page). At 1414, responsive to the page, the UE 1406 may initiate a radio connection supported by SIM 1445*b*. At 1416, AMF 1404*b* may transmit a page to UE 1406 intended for SIM 1445*b*. The page may include an indication (or cause) that the page is for a voice call, such as a VoLTE or VoNR call. At 1418, the SIM 1445*b* may, based on the priority of the voice call page, request RF resources from SIM 1445*a*. The request for RF resources may include an indication of a cause (or reason for the request), in this case, a voice call. At 1420, SIM 1445*a* may determine that a tune-away indication is necessary based on a cause (e.g., voice call for SIM 1445*b*) of the tune-away and transmit a tune-away indication, with a cause, a request to suspend PDU session(s) (e.g., a PDU session modification), and a value of a timer indicating a duration of the tune-away, to AMF 1404*a*. At 1422, AMF 1404*a* may accept the tune-away and transmit a confirmation of the PDU session modification as well as a temporary identifier (e.g.: an I-RNTI) to UE 106. At 1424*a* and 1424*b*, AMF 1404*a* and SIM 1445*a* may suspend the PDU session, e.g., for a duration as indicated by the timer. In some embodiments, an SMF may subsequently inform a UPF to discard downlink data for suspended PDU sessions. At 1426, SIM 1445*a* may grant the RF resource request. At 1428, the connection supported by SIM 1445*b* may initiate a radio connection with AMF 1404*b*. At 1430, once connected, the UE may perform the voice call. At 1432, upon completion of the voice call, SIM 1445*b* may grant RF resources back to SIM 1445*a*. Additionally, at 1434, SIM 1445*a* may transmit a PDU session modification request to indicate a request to resume the PDU session(s). Alternatively, in some embodiments, SIM 1445*a* may transmit a single NAS message to indicate a request to resume all suspended PDU session(s). The request may include the temporary identifier. At 1436, AMF 1404*a* may confirm the PDU session modification request and, at 1438, SIM 1445*a* may resume the PDU session via a PDU session modification complete message.

In some embodiments, the UE may signal to network an indication of the tune away (e.g., as described herein) and suspend the RRC Connection for a pre-determined (or pre-specified) duration via RRC signaling. In some embodiments, the UE may transmit an RRC suspend request message with a timer. The network may accept the request and store the UE's context in RRC-Inactive state. The network may then send an RRC release message with a unique temporary identifier (I-RNTI) which the UE may use when resuming the RRC session. In some embodiments, an RM state may be maintained as RM-REGISTERED and a CM state may be maintained as CM-CONNECTED with RRC-INACTIVE. In some embodiments, the UE may transmit an RRC resume request when/if tuning back prior to expiration of the pre-determined duration. In some embodiments, when/if the tune-away exceeds the pre-determined duration, the network and the UE may reset the UE context and delete the I-RNTI. In such instances, the UE may perform a registration procedure to setup a new RRC connection.

Figure 15:
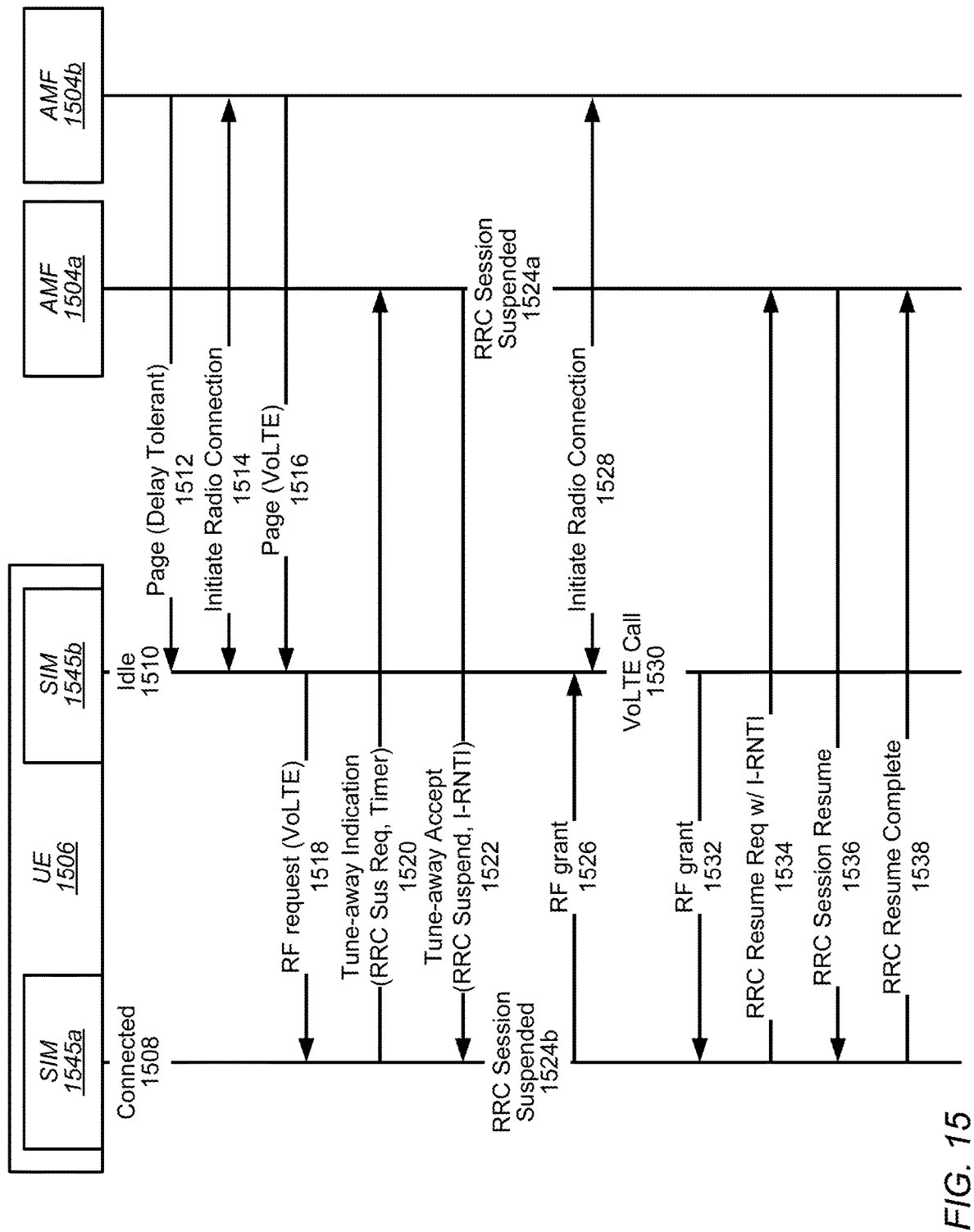
FIG. 15 illustrates a block diagram of an example of signaling between a UE and a network for a tune-away indication via an RRC message, according to some embodiments.

For example, FIG. 15 illustrates an example of a tune-away indication via an RRC message, according to some embodiments. The signaling shown in FIG. 15 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may operate as follows.

As shown, a UE 1506, which may be a UE 106, may include one or more UICCs, such as SIMs 1545*a* and 1545*b*. At 1508, a connection supported by SIM 1545*a* may be in a connected mode and, at 1510, a connection supported by SIM 1545*b* may be in an idle mode with respective access and mobility management functions (AMFs) 1504*a* and 1504*b*. The AMFs 1504*a* and 1504*b*, which may be AMFs 704, may be connected to various functions within the network, such as an SMSF and/or an IMS/5G core. At 1512, AMF 1504*b* may transmit a page to UE 1506 intended for SIM 1545*b*. The page may include an indication (or cause) that the page is delay tolerant (e.g., not high priority and/or is a low priority page). At 1514, responsive to the page, the UE 1506 may initiate a radio connection supported by SIM 1545*b*. At 1516, AMF 1504*b* may transmit a page to UE 1506 intended for SIM 1545*b*. The page may include an indication (or cause) that the page is for a voice call, such as a VoLTE or VoNR call. At 1518, the SIM 1545*b* may, based on the priority of the voice call page, request RF resources from SIM 1545*a*. The request for RF resources may include an indication of a cause (or reason for the request), in this case, a voice call. At 1520, SIM 1545*a* may determine that a tune-away indication is necessary based on a cause (e.g., voice call for SIM 1545*b*) of the tune-away and transmit a tune-away indication, with a cause, a request to suspend an RRC session, and a value of a timer indicating a duration of the tune-away, to AMF 1504*a*. At 1522, AMF 1504*a* may accept the tune-away and transmit a confirmation of the RRC session suspension as well as a temporary identifier (I-RNTI) to UE 106. At 1524*a* and 1524*b*, AMF 1504*a* and SIM 1545*a* may suspend the RRC session, e.g., for a duration as indicated by the timer. At 1526, SIM 1545*a* may grant the RF resource request. At 1528, the connection supported by SIM 1545*b* may initiate a radio connection with AMF 1504*b*. At 1530, once connected, the UE may perform the voice call. At 1532, upon completion of the voice call, SIM 1545*b* may grant RF resources back to SIM 1545*a*. Additionally, at 1534, AMF 1504*a* may transmit an RRC session resume request to indicate a request to resume the RRC session. The request may include the temporary identifier. At 1536, AMF 1504*a* may confirm the RRC session resume request and, at 1538, SIM 1545*a* may resume the RRC session via an RRC session resume complete message.

Figure 16:
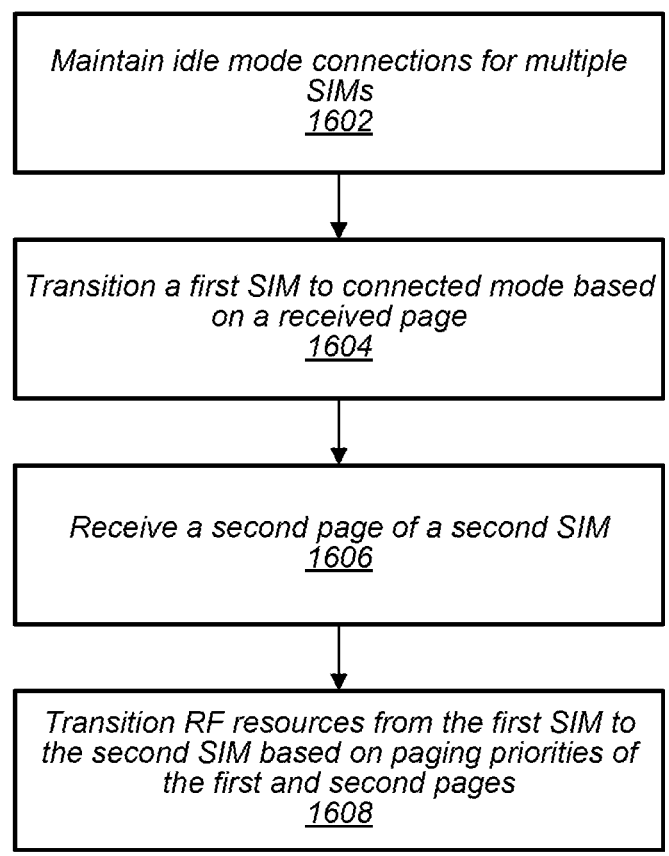
FIGS. 16-17 illustrate block diagrams of examples of methods for enhanced paging indications for a MU-SIM UE, according to some embodiments.

FIG. 16 illustrates a block diagram of an example of a method for enhanced paging indications for a MU-SIM UE, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1602, a multiple SIM UE (MU-SIM UE), such as UE 106, may maintain idle mode connections for multiple SIMs. In some embodiments, SIMs of the MU-SIM UE may share radio frequency (RF) resources. In other words, RF resources, such as transmit and/or receive circuitry may be shared across the SIMs of the MU-SIM UE.

At 1604, a first SIM may be transitioned to connected mode based on a first page received from the network, e.g., from a first AMF of the network. In some embodiments, the first page may include an indication of an associated first paging priority and/or a first paging cause. In some embodiments, the first paging priority may be associated with and/or correspond to the first paging cause. In some embodiments, paging priorities may be specified by an operator of a public land mobile network (PLMN). In some embodiments, paging priorities may be based on a service type (e.g., voice call such as VoLTE or VoNR, SMS, high priority data, background push, delay tolerant data, VoIP call, and so forth) of a page as well as an expected duration of an action associated with a page. In some embodiments, paging priorities may be based on a differentiated services code point (DSCP) marking in a type of service (e.g., for IPv4) or traffic class (e.g., for IPv6) field of a downlink internet protocol packet.

At 1606, a second page intended for a second SIM may be received from the network, e.g., from a second AMF of the network. In some embodiments, the second page may include an indication of a second paging priority and/or a second paging cause. In some embodiments, the second paging priority may be associated with and/or correspond to the second paging cause.

At 1608, RF resources may be transitioned form the first SIM to the second SIM based on a comparison of paging priorities indicated by the first page and the second page. In some embodiments, the transition may be based on a priority of the second page (e.g., as indicated by the second paging priority) being higher than a priority of the first page (e.g., as indicated by the first paging priority). In some embodiments, the MU-SIM UE may, after transitioning RF resources to the second SIM, respond to the second page, e.g., to perform a voice call, receive SMS data, receive high priority data, and so forth.

In some embodiments, transitioning to the second SIM may include transmitting, based on the indication of the second paging priority, a tune-away indication to the network, e.g., to the first AMF of the network and transitioning the first connection to idle mode. In some embodiments, the tune-away indication may include a cause for the tune-away. In some embodiments, the cause of the tune-away may be based, at least in part, on the indication of the second paging priority. In some embodiments, the tune-away indication may include a timer, where the timer may indicate a duration of the tune-away. In some embodiments, the timer may be based, at least in part, on the indication of the second paging priority.

In some embodiments, the tune-away indication may be included in a network access stratum (NAS) message. In some embodiments, responsive to receiving the first NAS message, the first AMF may suspend a protocol data unit (PDU) session associated with the first connection upon receipt of the indication of the tune-away. In some embodiments, the first NAS message may include a PDU session modification request. In some embodiments, the MU-SIM UE may receive a second NAS message from the first AMF. The second NAS message may include an indication of acceptance of the tune-away and a temporary identifier which the MU-SIM UE can use when resuming the PDU session. In some embodiments, the MU-SIM UE may transmit, to the first AMF, a third NAS message requesting resumption of the PDU session. The third NAS message may include the temporary identifier.

In some embodiments, the tune-away indication may be included in a radio resource control (RRC) message. In some embodiments, the first RRC message may include an RRC session suspension request. In some embodiments, the MU-SIM UE may receive a second RRC message to the MU-SIM UE. The second RRC message may include an indication of acceptance of the tune-away and a temporary identifier which the MU-SIM UE can use when resuming the RRC session. In some embodiments, the MU-SIM UE may transmit, to the first AMF, a third RRC message requesting resumption of the RRC session. The third RRC message may include the temporary identifier.

In some embodiments, transitioning to the second SIM may include determining, based on the indication of the second paging priority, to not transmit a tune-away indication to the network and transitioning the first connection to idle mode. In other words, if an amount of time required to perform actions associated with the second page is estimated to be lower than a threshold amount of time, the MU SIM UE may choose not to inform the network, e.g., the first AMF, of the tune-away.

In some embodiments, the second page may be ignored when a priority of the first page is higher than a priority of the second page.

In some embodiments, the MU-SIM UE may provide an indication of multiple SIM capabilities to the network. In some embodiments, the indication of multiple SIM capabilities may be provided via at least one of a network access stratum (NAS) registration request, a radio resource control (RRC) capability procedure, and/or an RRC UE assistance procedure. In some embodiments, when the indication of multiple SIM capabilities is provided via the NAS registration request, 1 bit of a NAS registration request message may be used to indicate multiple SIM support. In some embodiments, a 5GMM capability information element may include the 1 bit used to indicate multiple SIM support. In some embodiments, when the indication of multiple SIM capabilities is provided via the RRC capability procedure, the indication of multiple SIM capabilities may be included in an RRC capability message. In some embodiments, when the indication of multiple SIM capabilities is provided via the RRC UE assistance procedure, the indication of multiple SIM capabilities may be included in an RRC UE assistance message. In some embodiments, the indication of multiple SIM capabilities may indicate public land mobile network (PLMN) information and/or carrier name for each active SIM of the MU-SIM UE. In some embodiments, the network may increase paging retries based on the indication of MU-SIM capabilities.

In some embodiments, the MU-SIM UE may be configured to allow a user to dynamically enable/disable secondary SIMs. In some embodiments, a periodic registration request procedure, e.g., a periodic NAS registration request procedure, to update MU-SIM capabilities may be performed based on a change in a mode of a SIM. In some embodiments, the change in the mode may include activation or deactivation of a SIM. In some embodiments, the MU-SIM capabilities include public land mobile network (PLMN) information and/or carrier name for each activated SIM.

Figure 17:
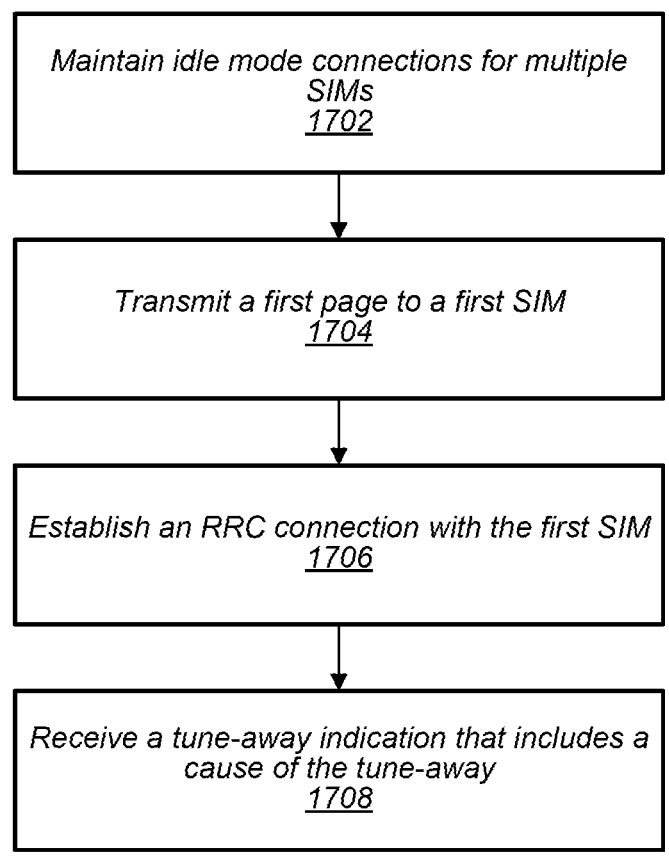

FIG. 17 illustrates block diagram of another example of a method for enhanced paging indications for a MU-SIM UE, according to some embodiments. The method shown in FIG. 17 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1702, idle mode connections for multiple SIMs of a multiple SIM UE (MU-SIM UE), such as UE 106, may be maintained by a network, e.g., by multiple AMFs of the network. In some embodiments, SIMs of the MU-SIM UE may share radio frequency (RF) resources. In other words, RF resources, such as transmit and/or receive circuitry may be shared across the SIMs of the MU-SIM UE.

At 1704, a first AMF of the network may transmit a first page to a first SIM of the MU-SIM UE. In some embodiments, the first page may include an indication of an associated first paging priority and/or first paging cause. In some embodiments, the first paging priority may be associated with and/or correspond to the first paging cause. In some embodiments, paging priorities may be specified by an operator of a public land mobile network (PLMN). In some embodiments, paging priorities may be based on a service type (e.g., voice call such as VoLTE or VoNR, SMS, high priority data, background push, delay tolerant data, VoIP call, and so forth) of a page as well as an expected duration of an action associated with a page. In some embodiments, paging priorities may be based on a differentiated services code point (DSCP) marking in a type of service (e.g., for IPv4) or traffic class (e.g., for IPv6) field of a downlink internet protocol packet.

At 1706, the first AMF may establish an RRC connection with the first SIM. In other words, the first AMF may perform an RRC procedure to transition a connection associated with the first SIM from an idle mode to a connected mode, e.g., in order to perform actions associated with the first page.

At 1708, the first AMF may receive a tune-away indication from the first SIM. The tune-away indication may include a cause of the tune-away, e.g., such as reception of a higher priority page by another active SIM of the MU-SIM UE, e.g., from another AMF of the network. In some embodiments, responsive to the tune-away indication, the first AMF may release the RRC connection. In some embodiments, the first AMF may ignore paging instances in which an associated paging priority is lower than a paging priority associated with the cause of the tune-away, e.g., at least until expiration of a timer associated with the tune-away indication and/or receipt of a request to resume the RRC connection from the MU-SIM UE.

In some embodiments, the first AMF may receive, from a short message service function (SMSF) of the network, an indication of short message service (SMS) data intended for the first SIM of the MU-SIM UE. In response, the first AMF may compare a priority of the SMS data to the cause of the tune-away (e.g., a priority associated with the cause of the tune-away). In some embodiments, the first AMF may determine, based, at least in part, on the comparison, that the MU-SIM UE is not available for delivery of the SMS data via cellular access (e.g., via 3GPP access). In some embodiments, responsive to the determination and/or based, at least in part, on the comparison, the first AMF may notify the SMSF that the MU-SIM UE is not available for delivery of the SMS data. In some embodiments, responsive to the determination and/or based, at least in part, on the comparison, the first AMF may transmit, via non-cellular access (e.g., non-3GPP access), a network access stratum (NAS) notification to the MU-SIM UE to indicate availability of the SMS data and transmit, via non-cellular access, the SMS data to the MU-SIM UE.

In some embodiments, the first AMF may receive, from a core (e.g., an IMS and/or 5G core) of the network, an indication of an incoming voice call (e.g., a VoLTE or VoNR call) intended for the first SIM of the MU-SIM UE. The first AMF may compare a priority of the voice call to the cause of the tune-away away (e.g., a priority associated with the cause of the tune-away). In some embodiments, the first AMF may transmit, based at least in part, on the comparison, a second page to the MU-SIM UE via a first connection associated with the first SIM. The second page may include an indication of an associated second paging priority that is a higher priority than a priority associated with the cause of the tune-away.

In some embodiments, the tune-away indication may be included in a first network access stratum (NAS) message. In some embodiments, responsive to receiving the first NAS message, the first AMF may suspend a protocol data unit (PDU) session associated with the first connection upon receipt of the indication of the tune-away. In some embodiments, the first NAS message may include a PDU session modification request. In some embodiments, the first AMF may, in response to receiving the first NAS message, transmit a second NAS message to the MU-SIM UE. The second NAS message may include an indication of acceptance of the tune-away and a temporary identifier which the MU-SIM UE can use when resuming the PDU session. In some embodiments, the first AMF may receive, from the MU-SIM UE, a third NAS message requesting resumption of the PDU session. The third NAS message may include the temporary identifier.

In some embodiments, the tune-away indication is included in a first radio resource control (RRC) message. In some embodiments, the first RRC message may include an RRC session suspension request. In some embodiments, the first AMF may, in response to receiving the first RRC message, transmit a second RRC message to the MU-SIM UE. The second RRC message may include an indication of acceptance of the tune-away and a temporary identifier which the MU-SIM UE can use when resuming the RRC session. In some embodiments, the first AMF may receive, from the MU-SIM UE, a third RRC message requesting resumption of the RRC session. The third RRC message may include the temporary identifier.

In some embodiments, the MU-SIM UE may provide an indication of multiple SIM capabilities to the network. In some embodiments, the indication of multiple SIM capabilities may be provided via at least one of a NAS registration request, a radio resource control (RRC) capability procedure, and/or an RRC UE assistance procedure. In some embodiments, when the indication of multiple SIM capabilities is provided via the NAS registration request, 1 bit of a NAS registration request message may be used to indicate multiple SIM support. In some embodiments, a 5GMM capability information element may include the 1 bit used to indicate multiple SIM support. In some embodiments, when the indication of multiple SIM capabilities is provided via the RRC capability procedure, the indication of multiple SIM capabilities may be included in an RRC capability message. In some embodiments, when the indication of multiple SIM capabilities is provided via the RRC UE assistance procedure, the indication of multiple SIM capabilities may be included in an RRC UE assistance message. In some embodiments, the indication of multiple SIM capabilities may indicate public land mobile network (PLMN) information and/or carrier name for each active SIM of the MU-SIM UE. In some embodiments, the network may increase paging retries based on the indication of MU-SIM capabilities.

In some embodiments, the MU-SIM UE may be configured to allow a user to dynamically enable/disable secondary SIMs. In some embodiments, a periodic registration request procedure, e.g., a periodic NAS registration request procedure, to update MU-SIM capabilities may be performed based on a change in a mode of a SIM. In some embodiments, the change in the mode may include activation or deactivation of a SIM. In some embodiments, the MU-SIM capabilities include public land mobile network (PLMN) information and/or carrier name for each activated SIM.

Further Example Embodiments

In some example embodiments, a method for a multiple subscriber identity module (SIM) user equipment device (MU-SIM UE) to determine actions responsive to a network page may include the MU-SIM UE, providing, to the network, an indication of multiple SIM capabilities;

maintaining idle mode connections for at least a first SIM and a second SIM, wherein radio frequency (RF) resources are shared between SIMs of the MU-SIM UE;

transitioning, upon receiving a first page from the network, a first connection associated with the first SIM to a connected mode, wherein the first page includes an indication of an associated first paging priority;

receiving, from the network, a second page intended for the second SIM, wherein the second page includes an indication of an associated second paging priority;

comparing the first paging priority to the second paging priority; and transitioning, responsive to the second paging priority being a higher priority than the first paging priority, RF resources from the first connection to a second connection supported by the second SIM to respond to the second page.

In some embodiments, the indication of multiple SIM capabilities may be provided via at least one of a network access stratum (NAS) registration request, a radio resource control (RRC) capability procedure, and/or an RRC UE assistance procedure.

In some embodiments, when the indication of multiple SIM capabilities is provided via the NAS registration request, 1 bit of a NAS registration request message may be used to indicate multiple SIM support. In some embodiments, a 5GMM capability information element may include the 1 bit used to indicate multiple SIM support.

In some embodiments, when the indication of multiple SIM capabilities is provided via the RRC capability procedure, the indication of multiple SIM capabilities may be included in an RRC capability message.

In some embodiments, when the indication of multiple SIM capabilities is provided via the RRC UE assistance procedure, the indication of multiple SIM capabilities may be included in an RRC UE assistance message.

In some embodiments, the indication of multiple SIM capabilities may indicate public land mobile network (PLMN) information and/or carrier name for each active SIM.

In some embodiments, the MU-SIM UE may be configured to allow a user to dynamically enable/disable secondary SIMs.

In some embodiments, the method may further include the MU-SIM UE performing, based on a change in a mode of a SIM, a periodic registration request procedure to update MU-SIM capabilities, wherein the change in the mode includes activation or deactivation of a SIM.

In some embodiments, the method may further include the MU-SIM UE performing, based on a change in a mode of a SIM, a periodic NAS registration request procedure to update MU-SIM capabilities, wherein the change in the mode includes activation or deactivation of a SIM.

In some embodiments, the MU-SIM capabilities may include public land mobile network (PLMN) information and/or carrier name for each activated SIM.

In some embodiments, based on the indication of MU-SIM capabilities, the network may increase paging retries.

In some embodiments, paging priorities may be specified by an operator of a public land mobile network (PLMN).

In some embodiments, paging priorities may be based on a service type of a page as well as an expected duration of an action associated with a page.

In some embodiments, paging priorities may be based on a differentiated services code point (DSCP) marking in a type of service (e.g., for IPv4) or traffic class (e.g., for IPv6) field of a downlink internet protocol packet.

In some embodiments, the method may further include the MU-SIM UE ignoring, responsive to the second paging priority being a lower priority than the first paging priority, the second page.

In some embodiments, transitioning, responsive to the second paging priority being a higher priority than the first paging priority, RF resources from the first connection to a second connection supported by the second SIM to respond to the second page may include the MU-SIM UE transmitting, based on the indication of the second paging priority, a tune-away indication to the network and transitioning the first connection to idle mode. In some embodiments, the tune-away indication may include a cause for the tune-away, wherein the cause is based on the indication of the second paging priority. In some embodiments, the tune-away indication may include a list of protocol data unit (PDU) sessions to be suspended. In some embodiments, the tune-away indication may include a timer, wherein the timer indicates a duration of the tune-away, and wherein the timer is based, at least in part, on the indication of the second paging priority. In some embodiments, the tune-away indication may be included in a network access stratum (NAS) message. In some embodiments, the tune-away indication may be included in a radio resource control (RRC) message.

In some embodiments, transitioning, responsive to the second paging priority being a higher priority than the first paging priority, RF resources from the first connection to a second connection supported by the second SIM to respond to the second page may include the MU-SIM UE determining, based on the indication of the second paging priority, to not transmit a tune-away indication to the network and transitioning the first connection to idle mode.

In some example embodiments, a user equipment device (UE), such as UE 106, may be configured to perform the method to determine actions responsive to a network page. The UE may include one or more antennas, one or more radios, wherein each of the one or more radios is configured to perform cellular communication using at least one radio access technology (RAT), at least a first subscriber identity module (SIM) and a second SIM in communication with the one or more radios, and one or more processors coupled to the one or more radios, wherein the one or more processors and the one or more radios are configured to perform voice and/or data communications.

In some example embodiments, a non-transitory computer readable memory medium may store program instructions executable by processing circuitry to cause a user equipment device (UE), such as UE 106, to perform the method to determine actions responsive to a network page.

In some example embodiments, an apparatus may be configured to perform the method to determine actions responsive to a network page. In some embodiments, the apparatus may include a memory and one or more processors in communication with the memory.

In some example embodiments, a method for a network to indicate a paging priority to a multiple subscriber identity module (SIM) user equipment device (MU-SIM UE) may include an access and mobility management function (AMF) of the network,
  receiving, from the MU-SIM UE, an indication of multiple SIM capabilities;
  establishing idle mode connections for at least a first SIM and a second SIM of the MU-SIM UE;
  transmitting, to the MU-SIM UE, a first page via a first connection associated with the first SIM, wherein the first page includes an indication of an associated first paging priority;
  establishing, with the MU-SIM UE, a radio resource control (RRC) connection to support a service associated with the first page;
  receiving, from the MU-SIM UE, an indication of a tune-away to a second connection supported by the second SIM, wherein the indication of the tune-away includes a cause of the tune-away and a duration of the tune-away; and
  releasing, at the AMF, the RRC connection.

In some embodiments, the method may include the AMF of the network receiving, from a short message service function (SMSF) of the network, an indication of short message service (SMS) data intended for the first SIM of the MU-SIM UE, comparing a priority of the SMS data to the cause of the tune-away, and notifying the SMSF that the MU-SIM UE is not available for delivery of the SMS data based, at least in part, on the comparison.

In some embodiments, the method may include the AMF of the network receiving, from a short message service function (SMSF) of the network, an indication of short message service (SMS) data intended for the first SIM of the MU-SIM UE, comparing a priority of the SMS data to the cause of the tune-away, determining, based, at least in part, on the comparison, that the MU-SIM UE is not available for delivery of the SMS data via cellular access, transmitting, via non-cellular access, a network access stratum (NAS) notification to the MU-SIM UE, wherein the NAS notification indicates availability of the SMS data, and transmitting, via non-cellular access, the SMS data.

In some embodiments, the method may include the AMF of the network receiving, from a core of the network, an indication of an incoming voice call intended for the first SIM of the MU-SIM UE, comparing a priority of the voice call to the cause of the tune-away, and transmitting, based at least in part, on the comparison, a second page to the MU-SIM UE via a first connection associated with the first SIM, wherein the second page includes an indication of an associated second paging priority, and wherein the second paging priority is a higher priority than a priority associated with the cause of the tune-away. In some embodiments, the voice call may be one of a voice over Long Term Evolution (VoLTE) call or a voice over New Radio (VoNR) call.

In some embodiments, the indication of multiple SIM capabilities may be received via at least one of a NAS registration request, a radio resource control (RRC) capability procedure, and/or an RRC UE assistance procedure.

In some embodiments, when the indication of multiple SIM capabilities is received via the NAS registration request, 1 bit of a NAS registration request message may be used to indicate multiple SIM support. In some embodiments, a 5GMM capability information element may include the 1 bit used to indicate multiple SIM support.

In some embodiments, when the indication of multiple SIM capabilities is received via the RRC capability procedure, the indication of multiple SIM capabilities may be included in an RRC capability message.

In some embodiments, when the indication of multiple SIM capabilities is received via the RRC UE assistance procedure, the indication of multiple SIM capabilities may be included in an RRC UE assistance message.

In some embodiments, the indication of multiple SIM capabilities may indicate public land mobile network (PLMN) information and/or carrier name for each active SIM.

In some embodiments, the MU-SIM UE may be configured to allow a user to dynamically enable/disable secondary SIMs.

In some embodiments, the method may include the AMF of the network performing, based on a change in a mode of a SIM at the MU-SIM UE, a periodic registration request procedure to update MU-SIM capabilities, wherein the change in the mode includes activation or deactivation of a SIM. In some embodiments, the MU-SIM capabilities may include public land mobile network (PLMN) information and/or carrier name for each activated SIM.

In some embodiments, the method may include the AMF of the network performing, based on a change in a mode of a SIM at the MU-SIM UE, a periodic NAS registration request procedure to update MU-SIM capabilities, wherein the change in the mode includes activation or deactivation of a SIM. In some embodiments, the MU-SIM capabilities may include public land mobile network (PLMN) information and/or carrier name for each activated SIM.

In some embodiments, based on the indication of MU-SIM capabilities, the network may increase paging retries.

In some embodiments, paging priorities may be specified by an operator of a public land mobile network (PLMN).

In some embodiments, paging priorities may be based on a service type of a page as well as an expected duration of an action associated with a page.

In some embodiments, paging priorities may be based on a differentiated services code point (DSCP) marking in a type of service (e.g., for IPv4) or traffic class (e.g., for IPv6) field of a downlink internet protocol packet.

In some embodiments, the tune-away indication may be included in a first network access stratum (NAS) message. In some embodiments, the method may include the AMF of the network suspending a protocol data unit (PDU) session associated with the first connection upon receipt of the indication of the tune-away. In some embodiments, the first NAS message may include a protocol data unit (PDU) session modification request. In some embodiments, the method may include the AMF of the network, in response to receiving the first NAS message, transmitting a second NAS message to the MU-SIM UE, wherein the second NAS message includes an indication of acceptance of the tune-away and a temporary identifier which the MU-SIM UE can use when resuming the PDU session. In some embodiments, the method may include the AMF of the network receiving, from the MU-SIM UE, a third NAS message requesting resumption of the PDU session, wherein the third NAS message includes the temporary identifier.

In some embodiments, the tune-away indication may be included in a first radio resource control (RRC) message. In some embodiments, the first RRC message may include an RRC session suspension request. In some embodiments, the method may include the AMF of the network, in response to receiving the first RRC message, transmitting, via a base station, such as base station 102, a second RRC message to the MU-SIM UE, wherein the second RRC message includes an indication of acceptance of the tune-away and a temporary identifier which the MU-SIM UE can use when resuming the RRC session. In some embodiments, the method may include the AMF of the network, receiving, from the MU-SIM UE via the base station, a third RRC message requesting resumption of the RRC session, wherein the third RRC message include the temporary identifier.

In some example embodiments, an apparatus may be configured to perform the method to indicate the paging priority to the MU-SIM UE. In some embodiments, the apparatus may include a memory and one or more processors in communication with the memory.

In some example embodiments, a non-transitory computer readable memory medium may store program instructions executable by processing circuitry to cause a network node to perform the method to indicate the paging priority to the MU-SIM UE.

In some example embodiments, a network node may be configured to perform the method to indicate the paging priority to the MU-SIM UE. In some embodiments, the network node may include at least one antenna, at least one radio in communication with the at least one antenna and configured to perform cellular communication using at least one radio access technology (RAT), and at least one processor in communication with the at least one radio.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
one or more antennas;
one or more radios, wherein each of the one or more radios is configured to perform cellular communication using at least one radio access technology (RAT);
at least a first subscriber identity module (SIM) and a second SIM in communication with the one or more radios;
one or more processors coupled to the one or more radios, wherein the one or more processors and the one or more radios are configured to perform voice and/or data communications;
wherein the one or more processors are configured to cause the UE to:
maintain, with a network, idle mode connections for at least the first SIM and the second SIM, wherein radio frequency (RF) resources are shared between the first SIM and the second SIM;
transition, upon receiving a first page from the network, a first connection associated with the first SIM to a connected mode, wherein the first page includes an indication of an associated first paging priority or a first paging cause;

receive, from the network, a second page intended for the second SIM, wherein the second page includes an indication of an associated second paging priority or second paging cause; and transition, responsive to the second paging priority or the second paging cause being a higher priority than the first paging priority or the first paging cause, RF resources from the first connection to a second connection supported by the second SIM to respond to the second page.

2. The UE of claim 1,
wherein the one or more processors are further configured to:
provide, to the network, an indication of multiple SIM capabilities.

3. The UE of claim 2,
wherein the indication of multiple SIM capabilities is provided via at least one of a network access stratum (NAS) registration request, a radio resource control (RRC) capability procedure, and/or an RRC UE assistance procedure.

4. The UE of claim 3,
wherein, when the indication of multiple SIM capabilities is provided via the NAS registration request, 1 bit of a NAS registration request message is used to indicate multiple SIM support;
wherein, when the indication of multiple SIM capabilities is provided via the RRC capability procedure, the indication of multiple SIM capabilities is included in an RRC capability message; and
wherein, when the indication of multiple SIM capabilities is provided via the RRC UE assistance procedure, the indication of multiple SIM capabilities is included in an RRC UE assistance message.

5. The UE of claim 4,
wherein a 5GMM capability information element includes the 1 bit used to indicate multiple SIM support.

6. The UE of claim 2,
wherein the indication of multiple SIM capabilities indicates public land mobile network (PLMN) information or carrier name for each active SIM.

7. The UE of claim 1,
wherein the one or more processors are further configured to allow a user to dynamically enable/disable secondary SIMs.

8. The UE of claim 1,
wherein the one or more processors are further configured to:
perform, based on a change in a mode of one of the first SIM or the second SIM, a periodic network access stratum (NAS) registration request procedure to update multiple SIM capabilities, wherein the change in the mode includes activation or deactivation of one of the first SIM or the second SIM, wherein the multiple SIM capabilities include at least one of public land mobile network (PLMN) information or carrier name for each activated SIM.

9. The UE of claim 1,
wherein paging priorities or paging causes are specified by an operator of a public land mobile network (PLMN); and
wherein paging priorities and paging causes are based on a service type of a page as well as an expected duration of an action associated with a page, and
wherein paging priorities and paging causes are based on a differentiated services code point (DSCP) marking in a type of service or traffic class field of a downlink internet protocol packet.

10. An apparatus, comprising:
a memory; and
at least one processor in communication with the memory, wherein the at least one processor is configured to:
provide, to a network, an indication of multiple SIM capabilities;
maintain, with the network, idle mode connections for at least a first SIM and a second SIM, wherein radio frequency (RF) resources are shared between the first SIM and the second SIM;
transition, upon receiving a first page from the network, a first connection associated with the first SIM to a connected mode, wherein the first page includes an indication of an associated first paging cause;
receive, from the network, a second page intended for the second SIM, wherein the second page includes an indication of an associated second paging cause; and
transition, responsive to a second paging priority corresponding to the second paging cause being a higher priority than a first paging priority corresponding to the first paging cause, RF resources from the first connection to a second connection supported by the second SIM to respond to the second page.

11. The apparatus of claim 10,
wherein, based on the indication of multiple SIM capabilities, the network increases paging retries attempts or increases a duration between paging retries.

12. The apparatus of claim 10,
wherein the second paging cause is associated with a voice call, wherein the voice call is one of a voice over New Radio (VoNR) call or a voice of Long Term Evolution (VoLTE) call.

13. The apparatus of claim 10,
wherein, to transition, responsive to the second paging priority being a higher priority than the first paging priority, RF resources from the first connection to a second connection supported by the second SIM to respond to the second page, the at least one processor is further configured to:
generate instructions to transmit, based on the indication of the second paging priority, a tune-away indication to the network, wherein the tune-away indication includes a cause for the tune-away, wherein the cause is based on the indication of the second paging priority, and wherein the tune-away indication includes a list of protocol data unit (PDU) sessions to be suspended; and
transition the first connection to idle mode.

14. The apparatus of claim 13,
wherein the tune-away indication includes a timer, wherein the timer indicates a duration of the tune-away, and wherein the timer is based, at least in part, on the indication of the second paging priority.

15. The apparatus of claim 13,
wherein the tune-away indication is included in at least one of a network access stratum (NAS) message or a radio resource control (RRC) message.

16. A non-transitory computer readable memory medium storing program instructions executable by processing circuitry to cause a user equipment device (UE) to:
- maintain, with a network, idle mode connections for at least a first SIM and a second SIM, wherein radio frequency (RF) resources are shared between the first SIM and the second SIM;
- transition, upon receiving a first page from the network, a first connection associated with the first SIM to a connected mode, wherein the first page includes an indication of an associated first paging priority;
- receive, from the network, a second page intended for the second SIM, wherein the second page includes an indication of an associated second paging priority; and
- ignore, responsive to the second paging priority being a lower priority than the first paging priority, the second page.

17. The non-transitory computer readable memory medium of claim 16,
- wherein the program instructions are further executable by processing circuitry to cause the UE to:
  - transition, responsive to the second paging priority being a higher priority than the first paging priority, RF resources from the first connection to a second connection supported by the second SIM to respond to the second page.

18. The non-transitory computer readable memory medium of claim 17,
- wherein, to transition, responsive to the second paging priority being a higher priority than the first paging priority, RF resources from the first connection to a second connection supported by the second SIM to respond to the second page, the program instructions are further executable by processing circuitry to cause the UE to:
  - determining, based on the indication of the second paging priority, to not transmit a tune-away indication to the network; and
  - transitioning the first connection to idle mode.

19. The non-transitory computer readable memory medium of claim 16,
- wherein the program instructions are further executable by processing circuitry to cause the UE to:
  - provide, to the network, an indication of multiple SIM capabilities, wherein the indication of multiple SIM capabilities is provided via at least one of a network access stratum (NAS) registration request, a radio resource control (RRC) capability procedure, and/or an RRC UE assistance procedure.

20. The non-transitory computer readable memory medium of claim 19,
- wherein, when the indication of multiple SIM capabilities is provided via the NAS registration request, 1 bit of a NAS registration request message is used to indicate multiple SIM support;
- wherein, when the indication of multiple SIM capabilities is provided via the RRC capability procedure, the indication of multiple SIM capabilities is included in an RRC capability message; and
- wherein, when the indication of multiple SIM capabilities is provided via the RRC UE assistance procedure, the indication of multiple SIM capabilities is included in an RRC UE assistance message.

* * * * *